US012762114B2

(12) United States Patent
Hazel

(10) Patent No.: US 12,762,114 B2
(45) Date of Patent: Oct. 13, 2026

(54) DATA PLATFORM USING GENERATIVE ARTIFICIAL INTELLIGENCE BASED ANALYSIS AND QUERIES APPLIED TO DATA SOURCES

(71) Applicant: ChaosSearch, Inc., Andover, MA (US)

(72) Inventor: Thomas Hazel, Boston, MA (US)

(73) Assignee: ChaosSearch, Inc., Andover, MA (US)

( * ) Notice: Subject to any disclaimer, the term of this patent is extended or adjusted under 35 U.S.C. 154(b) by 0 days.

(21) Appl. No.: 18/627,369

(22) Filed: Apr. 4, 2024

(65) Prior Publication Data

US 2024/0338361 A1 Oct. 10, 2024

Related U.S. Application Data

(60) Provisional application No. 63/494,221, filed on Apr. 4, 2023.

(51) Int. Cl.
*G06F 16/242* (2019.01)
*G06F 16/22* (2019.01)
*G06F 16/2452* (2019.01)

(52) U.S. Cl.
CPC ...... *G06F 16/2423* (2019.01); *G06F 16/2228* (2019.01); *G06F 16/2452* (2019.01)

(58) Field of Classification Search
CPC ............. G06F 16/2423; G06F 16/2228; G06F 16/2452; G06F 16/243
USPC .......................................................... 707/766
See application file for complete search history.

(56) References Cited

U.S. PATENT DOCUMENTS 6,282,537 B1 * 8/2001 Madnick ............. G06F 16/2471 707/763
2003/0135517 A1 * 7/2003 Kauffman ............. G06F 16/958
2005/0114318 A1 * 5/2005 Dettinger .......... G06F 16/24556
2006/0155691 A1 * 7/2006 Lowe .................. G06F 16/3322
2007/0073651 A1 * 3/2007 Imielinski ............... G06F 16/24
2009/0022298 A1 * 1/2009 Qiu ....................... H04L 47/125 379/211.01
2018/0300345 A1 * 10/2018 Brette ..................... G06F 16/22
2019/0034482 A1 * 1/2019 Werner ............... G06F 16/2393
2020/0364223 A1 * 11/2020 Pal .................... G06F 16/24539
2024/0119028 A1 * 4/2024 Kunz ..................... G06F 16/116
2024/0296275 A1 * 9/2024 Whitmore ............. G06F 40/166
2024/0296315 A1 * 9/2024 Singh ..................... G06N 3/045

* cited by examiner

*Primary Examiner* — Cam Y T Truong
(74) *Attorney, Agent, or Firm* — Procopio, Cory, Hargreaves & Savitch LLP

(57) ABSTRACT

A system for querying a database may receive, from a user interface, a query request. The system may transmit, to a generative AI system, a contextualized query based on the query request and context from the database. The system may receive, from the generative AI system, a query statement in response to the transmission of the contextualized query. The system may transmit, to the database, the query statement. The system may receive, from the database, a database response comprising a set of database entries in response to the transmission of the query statement. The system may transmit, to the user interface, an indication of the database response.

15 Claims, 12 Drawing Sheets

DATA PLATFORM USING GENERATIVE ARTIFICIAL INTELLIGENCE BASED ANALYSIS AND QUERIES APPLIED TO DATA SOURCES

CROSS-REFERENCE TO RELATED APPLICATION(S)

This application claims the benefit of and priority to U.S. Provisional Application Ser. No. 63/494,221, entitled "DATA PLATFORM USING GENERATIVE ARTIFICIAL INTELLIGENCE BASED ANALYSIS AND QUERIES APPLIED TO DATA SOURCES" and filed on Apr. 4, 2023, which is expressly incorporated by reference herein in its entirety.

TECHNICAL FIELD

The present disclosure relates generally to the field of object storage, and, more particularly, to methods and apparatus for resolving search queries.

BACKGROUND

Object storage is a type of data storage architecture that manages data as objects, which has become popular due to its prevalence in cloud storage services. Object storage may be considered a form of a distributed key/value storage service, where keys (unique indexes) and values (opaque data) are accessed via PUT, GET, and LIST interfaces. Consequently, such data is copied out to do a variety of processing and/or analysis, where the results of this external execution is often put right back into object storage. The cycle of Extracting, Transforming, and Loading (ETL) data is a large part of the data storage and management problem, though not the only issue. The advantages of object storage are its simplicity and scalability, encouraging cloud based storage services to be used as data lake repositories, where any type of data of any scale can be stored with the belief that value can be derived at a later date. However, this can lead to data being stored in a disjoined, disparate, and schema-less manner. Frequently, this unstructured data is irregular, malformed, and chaotic, which is a direct result of object storage constructs.

Knowing what has been stored in object storage (e.g., "what is in your buckets") is another issue. In other words, understanding "what" to extract and "how" to extract information from stored data is a major step before an ETL operation can be performed. The ability to group information into "like" subsets is important to efficiently use object storage. However, once this information has been identified, the actual data analysis is yet another significant hurdle to overcome. Analysis of such disjoined, disparate, or malformed data may be processed either through manual inspection via scaffolding such as via Hadoop™ (raw data) or through manual transformation for analytic services such as Amazon Redshift™ (tabular data) and/or Elastic™ (text data). Manual inspection and manual transformation are each time consuming, complicated, and costly, and may contribute to the failures of "data lakes."

SUMMARY

Aspects presented herein provide solutions to these problems, enabling such functionality to be embedded directly into object storage and, thus, making object storage smarter and more capable. Aspects include real-time indexing to make data available for analysis as quickly as possible while reducing the resources (e.g., time, cost, processing resources, and/or complexity) associated with real-time systems. That is, aspects disclosed herein enable improved performance, reduced latency, and improved scalability associated with real-time indexing and associated search/queries while reducing the leveraging of expensive and dedicated memory and processing resources. The aspects presented herein provide for improved access to data in combination with reduced complexity or cost for memory and processing resources.

Example techniques provide the efficient scaling of real-time indexing, for example, of big data. For example, disclosed techniques may lower the cost associated with real-time indexing. Additionally, disclosed techniques may provide scale and performance at big data scale using a non-complex implementation. Furthermore, the real-time indexing scheme disclosed herein is scalable so that latency of data availability is in the range of second to sub-second response times, rather than minutes and hours.

As mentioned above, real-time indexing allows data to be made available for analysis in a reduced amount of time, e.g., as quickly as possible. Whereas caching information improves query response times for previously requested information, the systems disclosed herein make new data available and committed in real-time (e.g., in less than a threshold interval). Thus, new data may be analyzed in a sub-second time range, which improves query performance.

According to one aspect of the present disclosure, a computer-implemented method, a computer-readable medium, and an apparatus are provided. The apparatus may receive, from a user interface, a query request. The apparatus may transmit, to a generative AI system, a contextualized query based on the query request and context from a database. The apparatus may receive, from the generative AI system, a query statement in response to the transmission of the contextualized query. The apparatus may transmit, to the database, the query statement. The apparatus may receive, from the database, a database response comprising a set of database entries in response to the transmission of the query statement. The apparatus may transmit, to the user interface, an indication of the database response. As used herein, a "set" of elements includes one or more elements, and a "subset" of a set includes one or more elements of a set.

In some aspects, the techniques described herein relate to a computer-implemented method, including: receiving, from a user interface, a query request; transmitting, to a generative AI system, a contextualized query based on the query request and context from a database; receiving, from the generative AI system, a query statement in response to the transmission of the contextualized query; transmitting, to the database, the query statement; receiving, from the database, a database response including a set of database entries in response to the transmission of the query statement; and transmitting, to the user interface, an indication of the database response.

In some aspects, the techniques described herein relate to a computer-implemented method, wherein the contextualized query includes a request for the query statement.

In some aspects, the techniques described herein relate to a computer-implemented method, further including: transmitting, to the database, a request for a set of metadata associated with a data structure of the database; receiving, from the database, the set of metadata; and generating the contextualized query based on the set of metadata.

In some aspects, the techniques described herein relate to a computer-implemented method, further including: receiving, from the user interface, a second indication of a set of metadata associated with a data structure of the database; and generating the contextualized query based on the set of metadata.

In some aspects, the techniques described herein relate to a computer-implemented method, wherein the contextualized query does not include the query request.

In some aspects, the techniques described herein relate to a computer-implemented method, wherein the contextualized query does not include data entry data from the database.

In some aspects, the techniques described herein relate to a computer-implemented method, wherein the context includes metadata associated with the database.

In some aspects, the techniques described herein relate to a computer-implemented method, wherein the context includes a set of characteristics associated with a structure for the query statement.

In some aspects, the techniques described herein relate to a computer-implemented method, wherein the set of characteristics includes at least one of a dialect, a language, a region, an order of operations, or a format.

In some aspects, the techniques described herein relate to a computer-implemented method, wherein the database is not associated with the generative AI system.

In some aspects, the techniques described herein relate to a computer-implemented method, wherein the context includes seeding information and characteristics information, wherein the seeding information is based on data from the database, wherein the seeding information includes contextual information associated with the query request, wherein the characteristics information is associated with a structure for the response from the database.

In some aspects, the techniques described herein relate to a computer-implemented method, wherein the query statement is based on the seeding information and the characteristics information.

In some aspects, the techniques described herein relate to a computer-implemented method, wherein the generative AI system includes a large language model (LLM).

In some aspects, the techniques described herein relate to a computer-implemented method, wherein the query request includes a natural-language format, wherein the query statement includes a database query format.

In some aspects, the techniques described herein relate to a computer-implemented method, wherein the database query format includes at least one of: a structured query language (SQL) database query format; or an Elasticsearch query format.

In some aspects, the techniques described herein relate to a computer-implemented method, further including: transmitting, to the user interface, the query statement; and receiving, from the user interface, database execution request before the transmission of the query statement to the database, wherein the transmission of the query statement to the database is in response to the reception of the database execution request.

According to one aspect of the present disclosure, a method for indexing in object storage is provided. The example method includes generating, at an object storage system, a first plurality of source data objects based on source files received at the object storage system, the source files having data, wherein the object storage system comprises an index based on a second plurality of source data objects in the object storage system, the index comprising a manifest file, at least one symbol file, and at least one locality file. The example method also includes generating one or more real-time manifest files based on the first plurality of source data objects, wherein each of the one or more real-time manifest files is associated with a segment of a workload being processed by a respective memory worker, the workload being based on the first plurality of source data objects. Additionally, the example method includes updating the index to include the one or more real-time manifest files. The example method also includes receiving a search query for at least one of the first plurality of source data objects and the second plurality of source data objects stored at the object storage system. Additionally, the example method includes generating a materialized view of a result set of the search query based on querying the index based on the search query, the manifest file, and the one or more real-time manifest files.

In another example aspect, a computer apparatus for indexing in object storage is provided. The example computer apparatus includes memory and at least one processor coupled to the memory. The memory and at least one processor are configured to generate, at an object storage system, a first plurality of source data objects based on source files received at the object storage system, the source files having data, wherein the object storage system comprises an index based on a second plurality of source data objects in the object storage system, the index comprising a manifest file, at least one symbol file, and at least one locality file. The memory and the at least one processor are further configured to generate one or more real-time manifest files based on the first plurality of source data objects, wherein each of the one or more real-time manifest files is associated with a segment of a workload being processed by a respective memory worker, the workload being based on the first plurality of source data objects. Additionally, the memory and the at least one processor are configured to update the index to include the one or more real-time manifest files. The memory and the at least one processor are also configured to receive a search query for at least one of the first plurality of source data objects and the second plurality of source data objects stored at the object storage system. Additionally, the memory and the at least one processor are configured to generate a materialized view of a result set of the search query based on querying the index based on the search query, the manifest file, and the one or more real-time manifest files.

According to another example aspect, a computer-readable medium is provided comprising instructions that comprises computer executable instructions for performing any of the methods disclosed herein. The computer-readable medium may be a non-transitory, computer-readable storage medium, for example.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
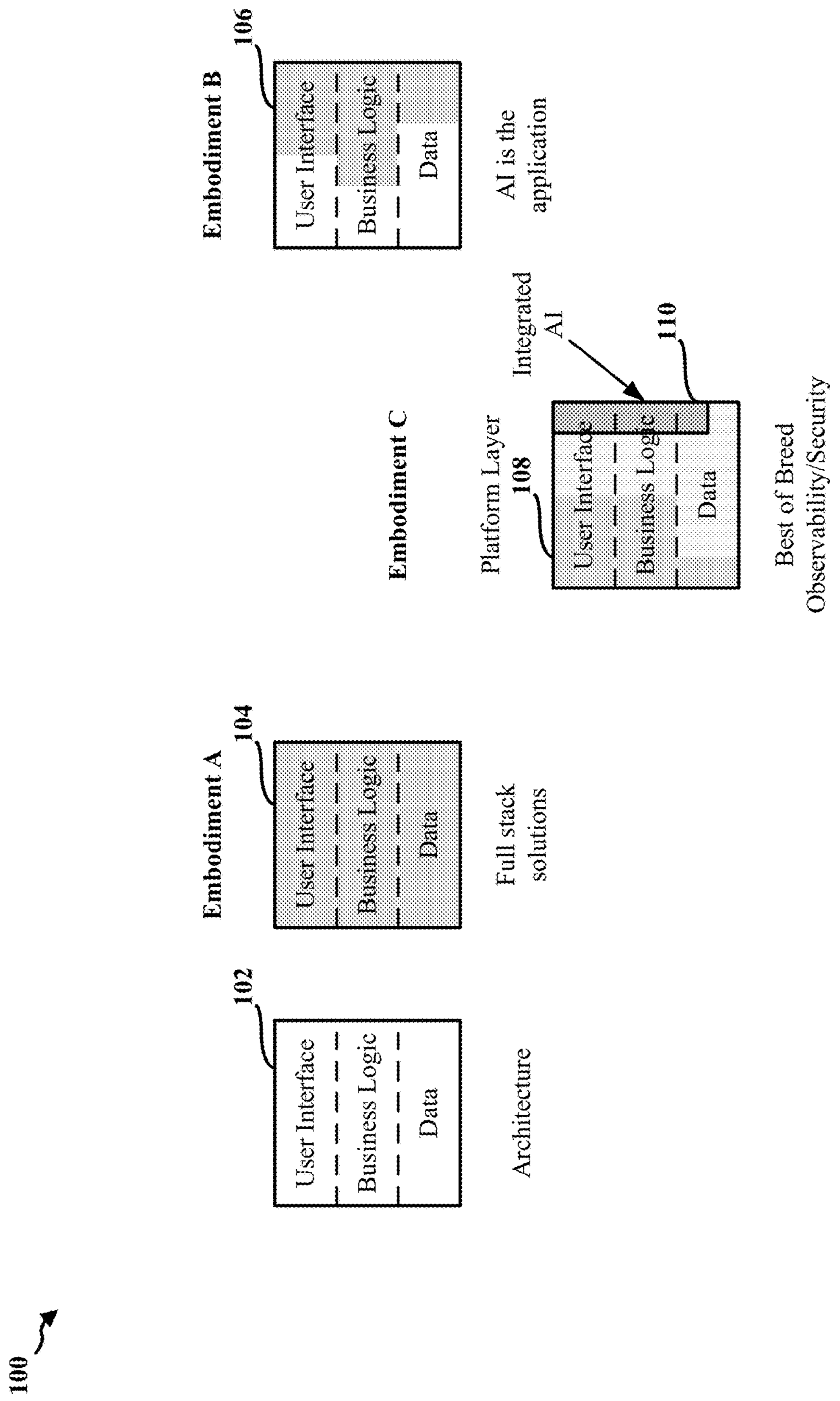
FIG. 1 is a diagram illustrating how applications may take a back seat to Generative AI interfaces, in accordance with various aspects of the present disclosure.

Example aspects are described herein in the context of a system, method, and computer program product for processing and analyzing data stored in object storage. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

With the explosion of Artificial Intelligence (AI) technology and market excitement, there are new opportunities once thought impossible or impractical, for example opportunities to develop generative AI (e.g., an AI system with the ability to generate media, such as text, audio, and/or images, in response to a set of prompts). Such systems may facilitate Artificial Generative Intelligence (AGI), such as an agent with the ability to understand or learn intellectual tasks that human beings or other animals can perform. An AGI system may include an AI system that generates content. Generative AI and AGI may drive new business and product thinking. However, with any innovation, there are problems needing to be solved. Additionally, along with considering time, cost, and complexity of such systems, it is beneficial that new solutions be smarter, faster, and more secure than existing systems.

The term "smarter" may refer to reducing the amount of errors (sometimes referred to as "hallucinations") one finds in Large Language Models (LLMs). An LLM may include a language model having a neural network that employs self-serving learning for training on large quantities of data (e.g., more than several terrabytes (TBs) or petabytes (PBs)). Such LLMs may include sets of neural networks with encoders and decoders with self-attention capabilities. Such encoders and decoders may be configured to extract meanings from a sequence of text to learn the relationships between words and phrases in a given sequence of text. Examples of LLMs may include OpenAI™, ChatGPT™, or Claude™. For example, a first system that has a lower average number of errors within a time period than a second system may be referred to as "smarter" than the second system. The term "faster" may refer to the time to train (e.g., load) new content. For example, a first system that is trained for use by a user in a lower amount of time than a second system may be referred to as "faster" than the second system. The term "more secure" may refer to the capability to use an AI system, such as an LLM system, while not sharing sensitive data entry content to the AI system-thereby preventing data being exposed via leaks, hacks, etc. For example, a first system that shares less data with an LLM system than a second system may be referred to as "more secure" than the second system.

In some examples, LLM systems may be leveraged by training the LLM system to provide value with more and more datasets (e.g., a larger number of datasets than an average LLM system) with human labeling plus reinforcement feedback to improve the LLM system. However, this process of training using larger amounts of data with human labeling and reinforcement feedback may be time consuming, complex, and costly. In some examples, a "semantic plugin" may be provided to existing models that helps correct errors in the model versus previous models. Such semantic plugins may improve the contextual recognition of terms for LLM systems using the semantic plugin. However, using such semantic plugins also utilizes a lot of work. For example, a semantic plugin may translate additional data (e.g., text, voice, audio, images, etc.) into embedded vectors, which the plugin may then load into a semantic database that is connected to an LLM system. In a way, semantic databases may be viewed as sub-models to a larger model. However, such techniques still have the same issues of time, cost, and complexity of such "super" models. Additionally, an independent developer may not have the ability to augment super models they may not own or manage. In other words, an independent developer may not have the rights to augment such super models.

In some aspects, an LLM system may be utilized by having a natural language drive "questions" to obtain "answers" for the questions. The semantics of such operations (e.g., a pipeline) may be challenging. That is, when there is a database that has "exact" answers and a user (e.g., a human or an application) knows how to correctly search (or query) the database, the "answer" to the "question" may be achieved. However, if the "question" is the issue, then the "answer" is at risk. In other words, if one cannot formulate a correct query statement, one might not obtain the right results. This is where semantic context may be useful. For example, natural language may be used to search, with context, which provides "meaning" to the question so that the "correct" query statement is created. In other words, a user may use natural language to search for a question using contextual data associated with the search, and then may use the question to query a database. Similar to LLM systems, semantic databases may be based on machine learning algorithms. As such, semantic databases may be susceptible to statistical errors as well. A semantic database may also add another level of inconsistency and risk. Such inconsistencies and risk may be referred to as "semantic errors." Some plugins (e.g., semantic plugins, semantic vector databases, etc.) may be used to minimize such hallucinations (i.e., answers to database queries that are incorrect due to the query not being formed correctly). However, such plugins too may introduce invalid results leading to more hallucinations.

It may be appreciated that LLM systems are leading the way in natural language, semantic context, and overall understanding to simulate a conversation. However, their usefulness may be limited to identifying "what something is" and "how to do something." What LLM systems are bad at is getting detailed correct answers. That is, the errors (e.g., hallucinations) are the result of bad retrieval of the facts and not the context of the question. For example, a question asking for the best hamburger in a restaurant that sells sushi may not yield as good results as a question asking for the best hamburger in a restaurant that sells hamburgers. In a way, LLM systems are good at the "what" and "how" queries, but not the actual implementation. For example, LLM systems may be wonderful at what understanding "what" a cup of coffee is and "how" to make the best version of coffee, but may not understand whether answers related to "what" a cup of coffee is or "how" to make the best version of coffee is an appropriate answer to a question without context. Such LLM systems may also know everything about coffee, from its history to how to bring it to market. It may also know the exact recipes to make a variety of products from coffee. However, LLM systems lack the capability (e.g., are not good at) its realization.

Aspects disclosed herein utilize the philosophy of "inverting the problem." That is, instead of addressing the hallucinations issue by plugging in an additional machine learning model (e.g., a semantic database), techniques disclosed herein facilitate increasing the correctness of semantic context that an LLM system provides. Such techniques also address the ingestion of data, which may solve real-time and scale, as well as security, for example, by avoiding configurations that allow a generative AI system to ingest sensitive data, for example data entries in a database.

In some aspects, to "invert" the problem, techniques disclosed herein ask the LLM system for some aspect of "understanding" and the "steps" to answer with a question with a better, contextualized question instead of asking the LLM to "realize" the answer. In other aspects, the LLM system may help explain what "it" is and what to ask (e.g., the contextualized question), but not ask the LLM system for the specific answer. For example, techniques disclosed herein facilitate asking an LLM how to ask the contextualized question and let an "exact" database execute the contextualized question to return the "correct" answer, or an answer with less propensity for error. For example, an LLM system may be asked about a particular topic, such as security. The LLM system may respond with the use of a company account (e.g., a service that helps enable operational and risk auditing, governance, and compliance of the account). From there, one may ask the LLM system how to analyze the data to provide the answers from the data logs. For instance, given a Structured Query Language (SQL) database that has the log data, one may provide the schema when one asks the LLM system to write an SQL query to detect errors and to monitor. The LLM system may respond with the "correct" query statement for this question. From there, a user may execute the query statement themselves (e.g., on their private data) to get the "correct" answer. Such techniques are in stark contrast to loading the services log data into an LLM system, a plugin, and/or a vector database to provide a "correct" answer, all of which may be slow, expensive, and less secure techniques.

Aspects disclosed herein utilize the ability of LLM systems to provide a semantic layer to provide context to what to ask, as well as the question to ask on a database, that provides more accurate results. In other words, techniques disclosed herein ask the LLM systems for the questions and not the answers. Such systems may then query a database with the contextualized question that is generated by the LLM system, to obtain an answer that is less prone to errors.

Some aspects disclosed herein facilitate how to "ask" the LLM system (sometimes referred to as a "super LLM"). Seeding each ask to the LLM with context may assist in obtaining correct "questions" to ask on the exact database. When integrating with an LLM system, aspects disclosed herein may be configured to avoid sharing any data in the exact database to the LLM system, which may be insecure, expensive, and/or slow. The ask of the LLM system may be preceded with "context" (e.g., from the exact database) prior to asking the question. For example, if one wanted to know about logs from an event logging service, one may share the exact database schema (and any metrics) it has as part of the ask. However, for aspects disclosed herein utilizing such a data pipeline, the "seeding" of the information may not be seen to the user. In other words, the contextualized seed may be transparent. Instead, the system may be configured to allow a user to ask the question and obtain a contextualized question. It is up to the techniques disclosed herein to connect to "ask to the metadata" before sending it to the LLM system. In some aspects, the techniques disclosed herein may be referred to as a "layer" of a data platform that facilitates ingesting and querying of data.

In addition to providing schema and metrics, aspects disclosed herein facilitate "how" the ask results are returned. In other words, if a particular response is wanted to correctly generate an SQL statement question, additional hidden asks may be sent as part of the major ask to the LLM system. For example, if a user asks for "how to write an SQL query for a logging service," a hidden ask may be to ensure that the query conforms to a particular SQL dialect or number of results to return, etc. Such hidden asks may also be referred to as context associated with a database. In some aspects, a system may query an LLM using a query request from a user, and context from the database, where the user does not see the context from the database via the user interface. The LLM may then return a contextualized question based on the query request and context from the database, where the contextualized question is formatted to obtain an answer from the database that is more accurate than if the query request was provided to the database without such context.

Various aspects relate generally to database query systems. Some aspects more specifically relate to database query systems that leverage generative AI systems (e.g., LLMs) to improve the answers obtained from databases. In some examples, a system for querying a database may receive, from a user interface, a query request. The query request may include a request for data from a database. The query request may include a request for a contextualized query to obtain data from a database. The user interface may include a terminal that a user may use to enter data into the system (e.g., a keyboard used to enter queries), and obtain data from the system (e.g., a display used to display contextualized queries from the system or data from a database). The system may transmit, to a generative AI system, a contextualized query based on the query request and context from the database. The system may receive, from the generative AI system, a query statement in response to the transmission of the contextualized query. The system may transmit, to the database, the query statement. The system may receive, from the database, a database response comprising a set of database entries in response to the transmission of the query statement. The system may transmit, to the user interface, an indication of the database response.

Particular aspects of the subject matter described in this disclosure can be implemented to realize one or more of the following potential advantages. In some examples, by using a generative AI system to generate a contextualized query based on context from a database, the described techniques can be used to improve the accuracy of database queries by contextualizing queries with generative AI system that are well-trained in generating contextualized queries based on a query request and database context. Such generative AI systems do not require expensive and repetitious training on databases that are constantly being updated with new data, since the generative AI used to generate contextualized queries does not change over time as rapidly as the generative AI used to accurately pull data from databases that are constantly being updated with new data. Moreover, since the generative AI system does not receive data from the databases, only context (e.g., metadata, high-level schema, query structure information), the system is more secure as there is less danger of sensitive data leaking via use of the generative AI system when data entry data from the database is not input into the generative AI system. High-level schema may include a subset of the database metadata (e.g., name of dataset, field names, types for each field name).

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

FIG. 1 is a diagram 100 illustrating how applications may take a back seat to Generative AI interfaces in view of techniques disclosed herein. In other words, diagram 100 illustrates different embodiments may utilize generative AI to obtain data from databases. For example, the diagram 100 illustrates a relationship between a user interface, business logic, and data that may be employed in a first embodiment, shown as Embodiment A, and which aspects may be managed by Generative AI interfaces in a second embodiment, shown as Embodiment B.

In Embodiment A, the system 102 may include a system architecture with business logic that bridges a user interface (e.g., a user terminal) and data (e.g., a database) without any generative AI components. The business logic may include a database interface, for example a structured query language (SQL) or an Elasticsearch interface. Such a system may provide a user access to data via a user interface, but may be difficult to use without extensive training on both the database and the business logic used to bridge the user interface and the data.

In embodiment A, the system 104 may have a full stack solution that utilizes generative AI that is regularly trained on data and a user interface. Human users may repeatedly provide labels to the system, and may provide reinforcement feedback at regular intervals to update the full stack solution on a regular basis, for example several times a day. While such full stack solutions may work extremely well, repeatedly training the full system 104 with labels and reinforcement feedback can be expensive and resource-intensive. Moreover, if the data in system 104 is updated without also training the generative AI, system 104 may hallucinate and provide incorrect answers based on the new updated data in the system 104. Moreover, in order to maintain security, system 104 may be completely self-contained, to prevent data from leaking to other users of the generative AI. This means that the generative AI used in system 104 may not be accessed by other users who do not have access to the data, limiting the scalability of such systems, as each system may be built with its own generative AI, repeatedly trained to improve the accuracy and accessibility of system 104.

In embodiment B, the system 106 may have a bifurcated user interface layer, a bifurcated business logic layer, and a bifurcated data layer. Each layer may be managed by a generative AI interface that self-trains and limits data access to users and entities who have authorization to access the data in the database.

In embodiment C, a platform layer 108 may have an integrated AI 110 may be used to bridge a generative AI system and the data. The integrated AI 110 may analyze the data to provide contextual metadata to the generative AI system, so that the generative AI system may generate contextualized queries for the data. The integrated AI 110 may not provide data entry data to the generative AI system, unless the generative AI system is explicitly granted access rights to the sensitive data by an admin user (e.g., the generative AI may be installed on a private intranet that is not accessible by public systems). The integrated AI 110 may use the contextualized query to obtain more accurate data in a manner that has less propensity to provide hallucinogenic answers. The generative AI may not be trained using the data, but may be trained to generate contextualized queries based on context (e.g., metadata describing a database) and a structure for the contextualized queries.

Figure 2A:
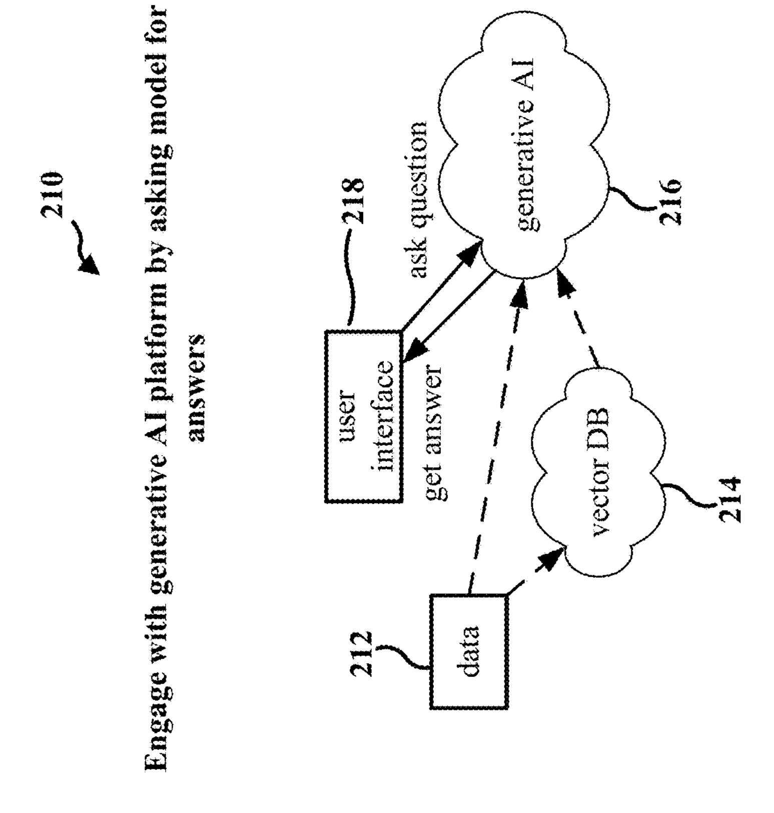
FIG. 2A is a diagram illustrating an exemplary first model system, in accordance with various aspects of the present disclosure.

FIG. 2A is a diagram illustrating a first model system 210. The example first model system 210 is directed to a system configured to engage with generative AI platforms (e.g., generative AI services). The first model system 210 illustrates an "ask model for answers" technique. For example, the first model system 210 includes data source 212 (e.g., a client database) that may provide data to a generative AI 216. The generative AI 216 may include an LLM which may be trained based on the data source 212. In some aspects, the data source 212 may be a dynamic database that is updated with data, for example a database of items distributed by a corporation, or a database of media stored by a server, or a database of services provided by a company. In some aspects, the generative AI 216 may be periodically trained based on the data source 212 to improve search results using the generative AI 216. In some aspects, the data source 212 may leverage a vector database 214, which may be configured to provide modified data to the generative AI 216. In some aspects, the vector database 214 may help reduce (or minimize) the hallucination issue. In some aspects, the vector database 214 may be periodically trained based on the data source 212 to improve search results using the generative AI 216. As shown in FIG. 2A, a user interface 218 may transmit a question to the generative AI 216. In response, the generative AI 216 may return an answer based on the question. However, the generative AI 216 may provide hallucination answers that are inaccurate if the vector database 214 and/or the generative AI 216 has not been periodically trained based on updated data stored in the data source 212. If the vector database 214 and/or the generative AI 216 has been periodically trained based on updated data stored in the data source 212, such training may be very expensive, particularly if the training involves human labeling plus reinforcement feedback.

Figure 2B:
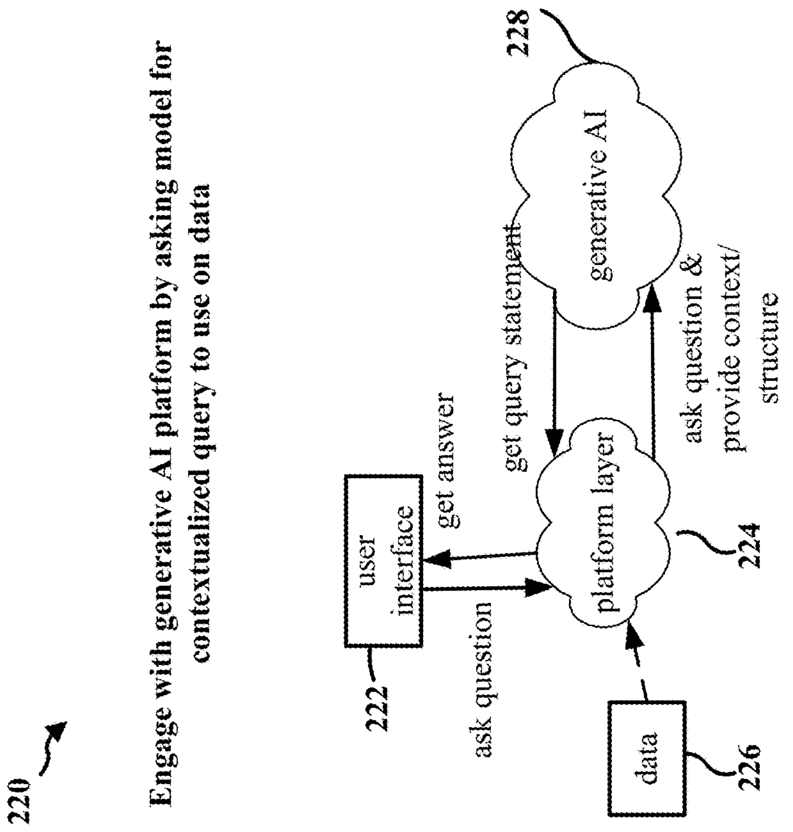
FIG. 2B is a diagram illustrating an exemplary second model system, in accordance with various aspects of the present disclosure.

FIG. 2B is a diagram illustrating a second model system 220. The example second model system 220 is directed to an inverted model for engaging with generative AI platforms, as disclosed herein. In contrast to the first model system 210 in FIG. 2A, the second model system 220 in FIG. 2B illustrates an "ask model for questions . . . ask data platform for answers" technique. For example, a user interface 222 may transmit a question to ask and to generate queries, if desired. A platform layer 224 may receive the request and "seed" a generative AI 228 with schema, metrics, and/or hints (e.g., metadata) based on data in a data source 226 (e.g., a client database). However, no data from the data source 226 is provided to the generative AI 228. In other words, the platform layer 224 may be configured to limit data transmitted to the generative AI 228. The platform layer 224 may be configured to not transmit data entry data from the data source 226. Data entry data may include data saved in storage, for example data saved to a cell in a database or packaged data saved on the data source 226. The platform layer 224 may be configured to transmit metadata to the generative AI 228. The metadata may include high-level schema, such as standard database metadata plus contextualization. For example, the metadata may include at least one of a table name, a name of columns in a table, a data type for each column in a table, a description of each column in the table, whether the data in a column of a table is key data, or min/max values in a column of a table. In other words, the metadata may include information of the structure of the data source 226, and words that may be used to contextualize the metadata (e.g., words or phrases that are closely associated with a column). The platform layer 224 may be configured to transmit a set of characteristics associated with a structure for the context, and/or a structure for the query statement provided by the generative AI 228.

The generative AI 228 may be configured to generate questions to ask and/or queries (e.g., a query statement based on the context of the data source 226) based on the data stored in the data source 226 without accessing the actual data. In some aspects, the generative AI 228 may generate the query statement, questions to ask and/or queries with the additional "context" (e.g., schema, metrics, and/or hints) that the platform layer 224 provides so that the generative AI 228 creates the "correct" query statement. The generative AI 228 may provide the "correct" query statement to the platform layer 224. The platform layer 224 may use the provided "correct" query statement to query the data source 226 to get answers to provide to the user interface 222.

As shown in FIG. 2A, the first model system 210 may be associated with statistically-relevant answers (e.g., answers that are semantic-based). However, the first model system 210 may also be associated with a security risk as the generative AI 216 may utilizes client data from the data source 212 or the vector database 214 to provide answers. The first model system 210 may also be associated with high costs as, at any scale, generative AI cost skyrockets-particularly to keep the generative AI 216 updated with updated data in the data source 212. Additionally, the first model system 210 may be associated with hallucinations as answers are not non-deterministic and also may include "invented data." In some aspects, the issue with invented data may be resolved via the use of vector databases, such as the vector database 214.

As shown in FIG. 2B, the second model system 220 may be associated with deterministic answers as questions are asked on exact data (e.g., the client database). The second model system 220 may also be associated with reduced (or eliminated) security risks as client data is not shared with the generative AI 228. Additionally, the second model system 220 may be associated with low cost as data at scale is not loaded into the generative AI 228. The second model system 220 may also be associated with no (or minimized) hallucinations as questions are answered with exact data from the data source 226, which also supports real-time and at-scale analytics.

An example of using the second model system 220 may be for the user interface 222 to transmit a query to the generative AI 228 (e.g., an LLM), about a particular topic, such as security. The question may be, for example, "Generative AI, can you tell me how companies detect errors and monitor their environment for a cloud environment?" The generative AI 228 may respond to the user interface 222 with the use of data associated with a company database labeled "log_1." In some aspects, the generative AI 228 may base the response off of contextual metadata associated with the data source 226. The user interface 222 may then respond with a question asking how to analyze the data in the company database labeled "log_1" to provide the answers from the data source 226. For example, give a SQL database that has logged data, the user interface 222 may request from the generative AI 228 to write an SQL query to detect errors and monitor the company database labeled "log_1." The generative AI 228 may then provide schema for such an SQL query. The generative AI 228 may then respond with the "correct" query statement associated with the question. The user interface 222 may execute the query statement received from the generative AI 228, or may command the platform layer 224 to execute the query statement received from the generative AI 228. This is in stark contrast to the first model system 210 in FIG. 2A, which may load data from the data source 212 into the generative AI 216 and/or plug in the vector database 214, which may be slower, more expensive, and/or less secure than the second model system 220 in FIG. 2B. In some aspects, the generative AI 228 may not be trained or modified (e.g., using retrieval augmented generation (RAG) vectors) based on the data source 226.

The platform layer 224 may be configured to seed each ask to the generative AI 228 to obtain correct query statements to use to query the data source 226. When integrating with the generative AI 228, the platform layer 224 may not share any of the data entry data from the data source 226 with the generative AI 228. Instead, the platform layer 224 may transmit a question with context associated with the data source 226, either with the question or before transmitting the question. For example, the platform layer 224 may transmit database schema and/or any metrics associated with the data source 226. The metadata included may include, for example, attributes of information under management (e.g., schema), metrics (e.g., cardinality, min, max), or actual results (which may not be shared with the generative AI 228, but may be used to generate context to share with the generative AI 228). The user interface 222 may not see any of this seeding of information. In other words, such seeding may be transparent to the user interface 222. In some aspects, additional hidden asks may be transmitted to the generative AI to ensure that a query statement conforms to a particular SQL dialect or number of results to return. Such characteristics of the structure may include, for example, at least one of a dialect, a language, a region, an order of operations, or a format. In some aspects, the query request from the user interface 222 (original asked question) may be in a national language format, and the generative AI 228 may provide a query statement in a database query format.

In some aspects, the platform layer 224 may share portions of the data entry data from the data source 226 with the generative AI 228. For example, if an instruction from the user interface 222 asks the platform layer 224 to provide specified portions (e.g., data entry data from column names or row indicators indicated by the user interface 222) to the generative AI 228, or the entirety of a database to the generative AI 228. Such embodiments may be appropriate for private systems where the generative AI 228 is walled off from other systems (e.g., within a private intranet) or for data that is not private or has a low level of security clearance.

Figure 3:
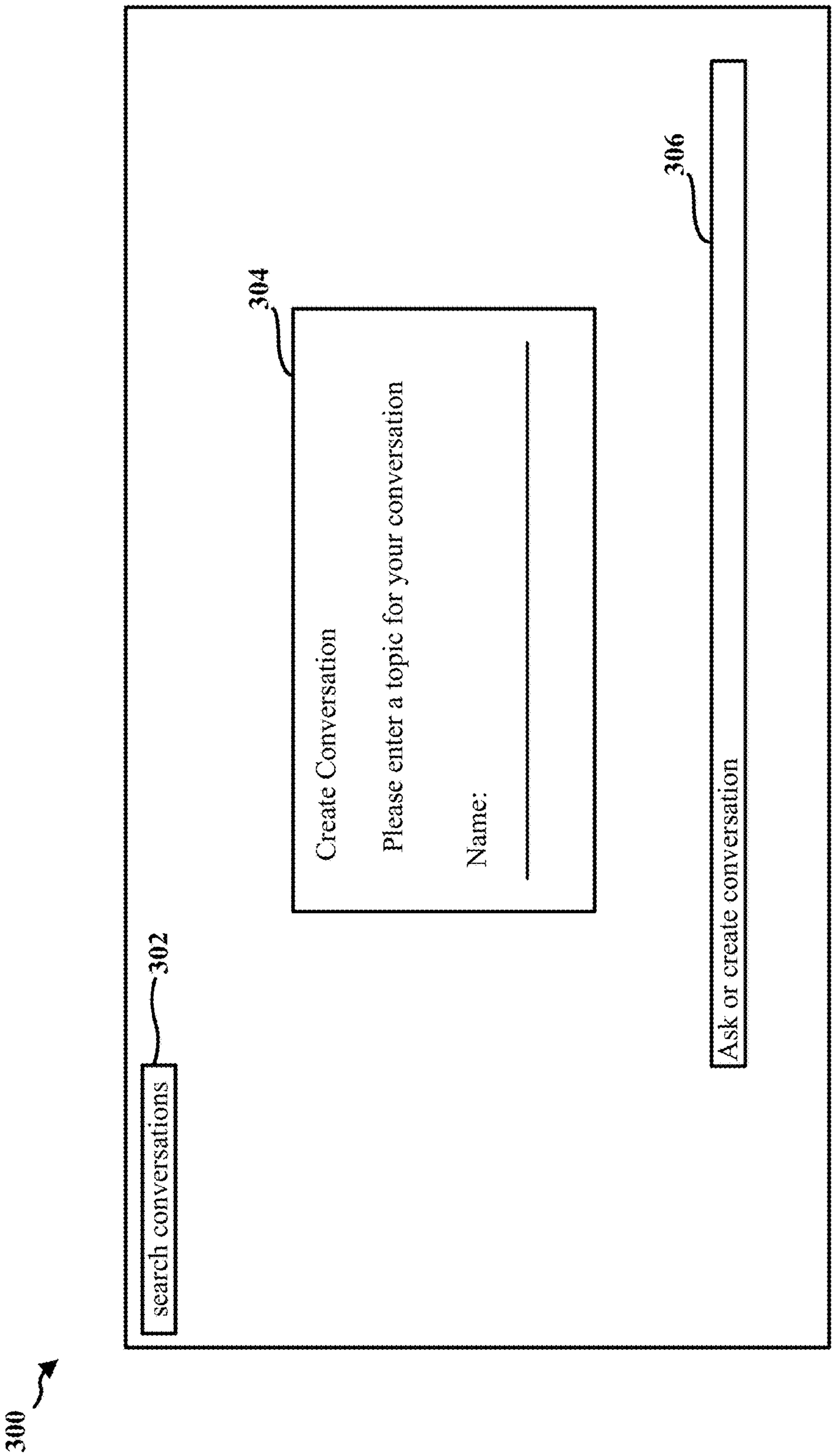
FIG. 3 is a diagram that illustrates a user interface, in accordance with various aspects of the present disclosure.

FIG. 3 is a diagram that illustrates a user interface 300. The user interface 300 may be used to initiate a conversation with a generative AI, such as the generative AI 228 of FIG. 2B. The user interface 300 may have a search bar 302 allowing a user to search different conversations with the generative AI. Each conversation may be associated with a chain of thought, for example a series of questions asked by a user and a series of responses provided by the platform. In other words, when a user asks a question in a chain of thought, the system may use any of the content from the conversation in its search query (e.g., a previous question, a previous response, previous data or metadata that was used to process a previous question or to provide a previous response). The conversation may be used to seed a contextualized query to a generative AI based on context from the conversation, for example a database selected by a user or a data type selected by a user. The user interface 300 may have a conversation topic organizer 304 which may be used to label a conversation. The platform may associate each conversation identifier (e.g., a time stamp, a label) with a set of characteristics that may be used to add context to a contextualized query. The user interface 300 may have an input box 306 that may be used by a user to initiate a conversation with the platform.

Figure 4:
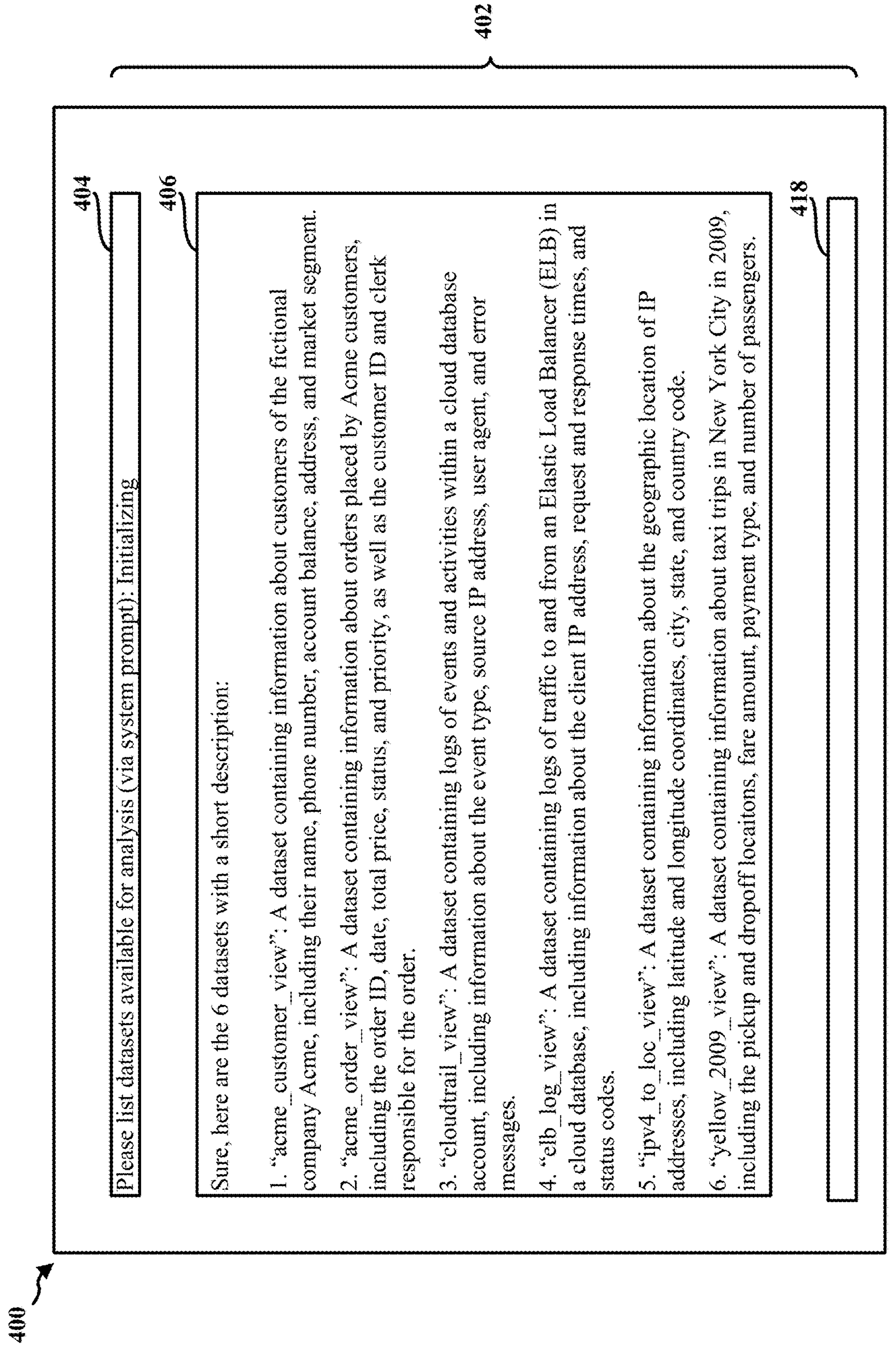
FIG. 4 is a diagram that illustrates another user interface including portions of a conversation, in accordance with various aspects of the present disclosure.

FIG. 4 is a diagram that illustrates a user interface 400 including portions of a conversation 402, as presented herein. In the illustrated example of FIG. 4, the conversation 402 may include a first statement 404 from a user, such as a user of the user interface 222 of FIG. 2B, to a contextualizer, such as the platform layer 224 of FIG. 2B. The first statement 404 may include a natural language question to a contextualizer. The first statement 404 may be provided to the contextualizer by default upon opening a conversation. Here, the first statement 404 asks the contextualizer for datasets available for analysis. In other words, the first statement 404 asks what datasets the contextualizer has metadata on. The contextualizer may respond to the first statement 404 with a first response 406. The first response 406 may be based on metadata that the contextualizer has on a data source, such as the data source 226 in FIG. 2B. The first response 406 may include a set of database labels, descriptions associated with each of the database labels, and a set of metadata, such as names of columns for each database.

The user interface 400 may include an input box 418, which may be used by a user to input statement queries to the contextualizer.

Figure 5:
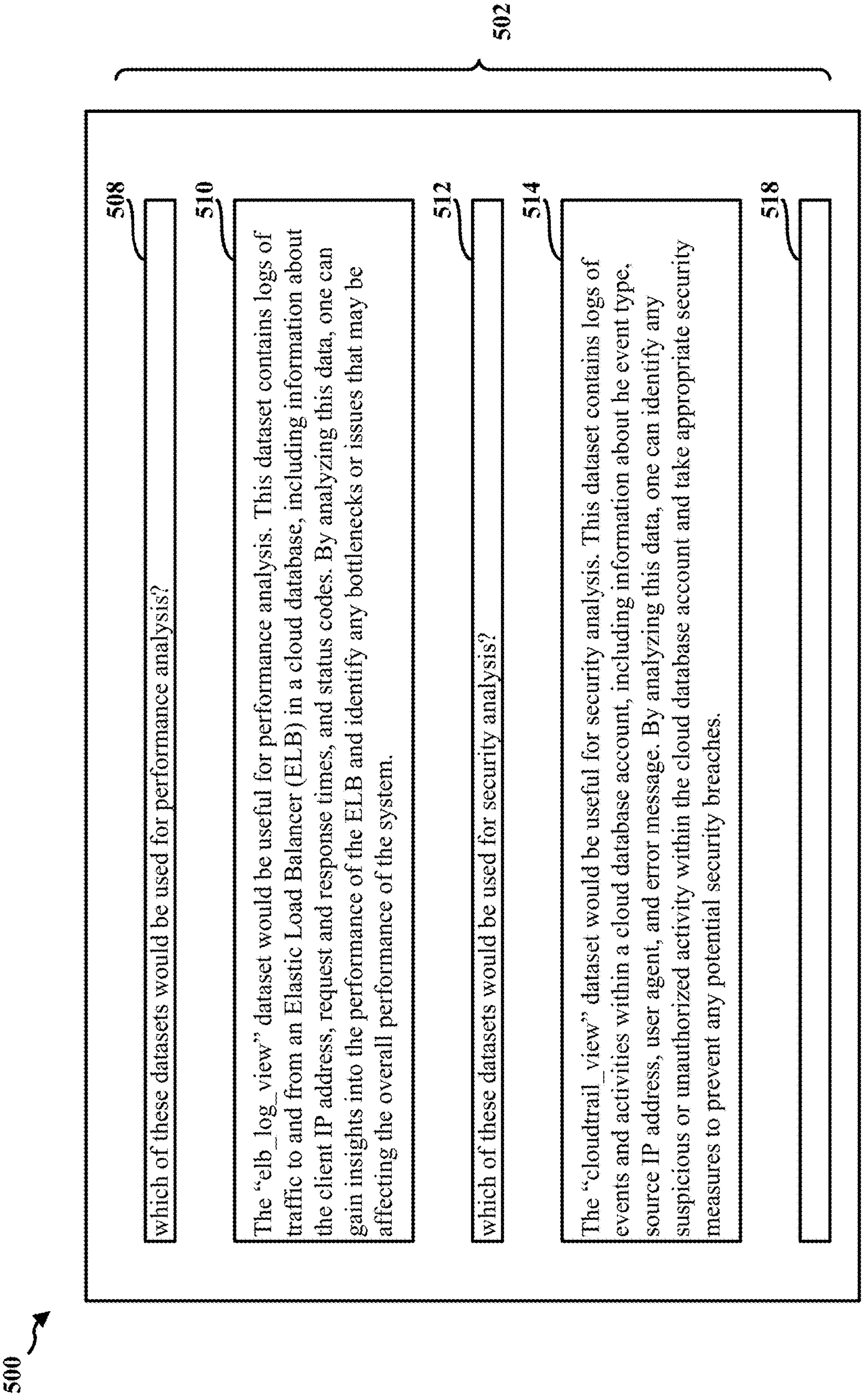
FIG. 5 is a diagram that illustrates another user interface including portions of a conversation, in accordance with various aspects of the present disclosure.

FIG. 5 is a diagram that illustrates a user interface 500 including portions of a conversation 502, as presented herein. The conversation 502 may be a continuation of the conversation 402 of FIG. 4. The conversation 502 includes a second statement 508 from a user, such as a user of the user interface 222 of FIG. 2B, to a contextualizer, such as the platform layer 224 of FIG. 2B. The second statement 508 may include a follow-up question asking which of the datasets of the first response 406 in FIG. 4 may be used for performance analysis. The contextualizer may respond with a second response 510. The second response 510 may be based on the previous first response 406 and/or the previous first statement 404. In other words, the contextualizer may use prompt engineering to contextualize the second statement 508. The contextualizer may transmit a second response 510 to the user interface 500, which may identify at least one dataset that is associated with the phrase "performance analysis," and may provide metadata associated with the phrase "performance analysis" and/or the dataset.

The conversation 502 includes a third statement 512 from a user, such as a user of the user interface 222 of FIG. 2B, to a contextualizer, such as the platform layer 224 of FIG. 2B. The third statement 512 may include a follow-up question asking which of the datasets of the first response 406 in FIG. 4 may be used for security analysis. The contextualizer may respond with a third response 514. The third response 514 may be based on the previous first response 406, the previous first statement 404, the previous second statement 508, or the previous second response 510. In other words, the contextualizer may use prompt engineering to contextualize the third statement 512. The contextualizer may transmit a third response 514 to the user interface 500, which may identify at least one dataset that is associated with the phrase "security analysis," and may provide metadata associated with the phrase "security analysis" and/or the dataset.

The user interface 500 may include an input box 518, which may be used by a user to input statement queries to the contextualizer.

Figure 6:
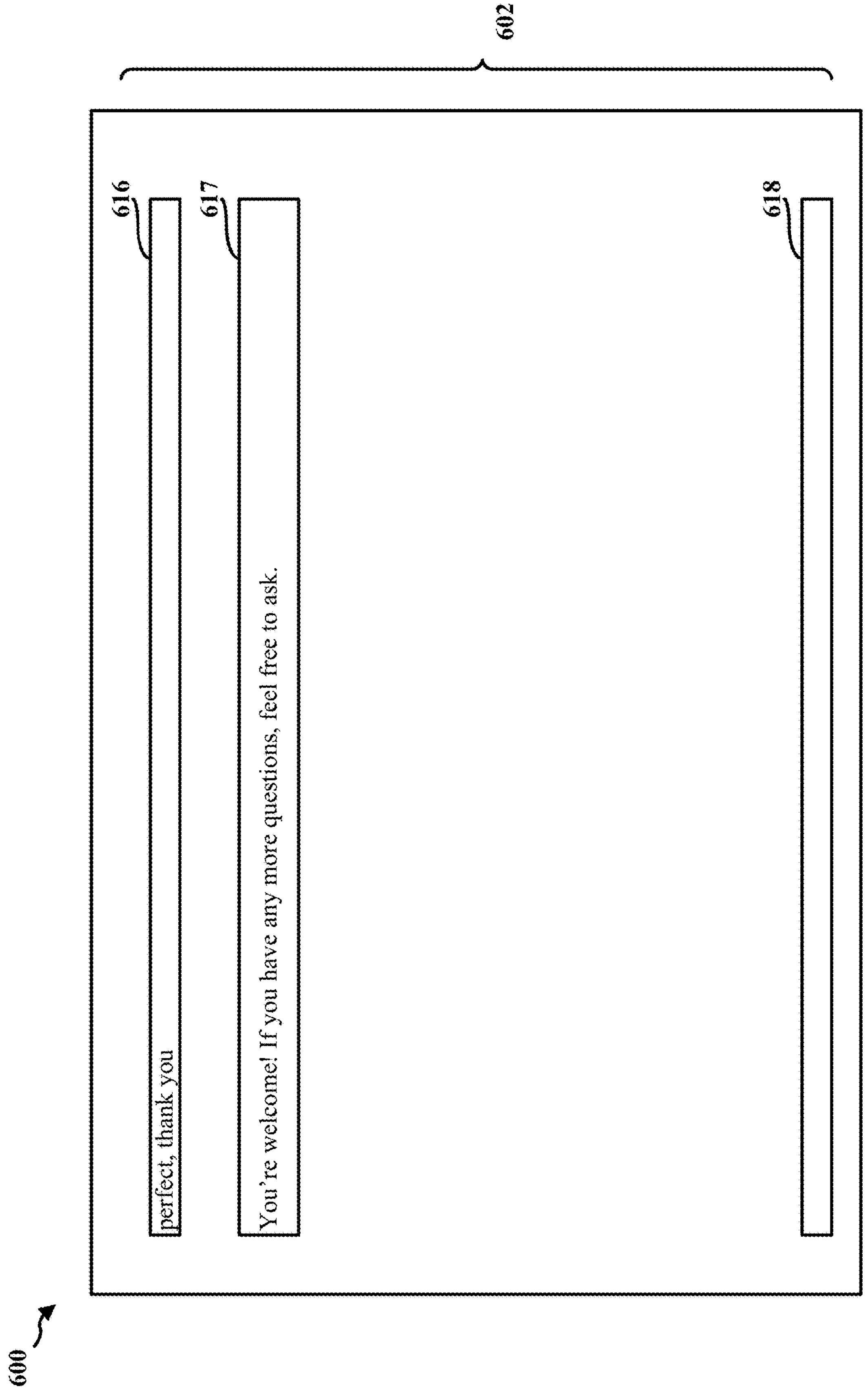
FIG. 6 is a diagram that illustrates another user interface including portions of a conversation, in accordance with various aspects of the present disclosure.

FIG. 6 is a diagram that illustrates a user interface 600 including portions of a conversation 602, as presented herein. The conversation 602 may be a continuation of the conversation 502 of FIG. 5. The conversation 602 includes a fourth statement 616 from a user, such as a user of the user interface 222 of FIG. 2B, to a contextualizer, such as the platform layer 224 of FIG. 2B. The fourth statement 616 may include a follow-up statement thanking the contextualizer for provided information. The contextualizer may respond with a fourth response 617, which may trigger closing the conversation and saving the conversation thread to memory. A user may then use a search function, for example the search bar 302, to revisit a conversation, which may be useful as the conversation has contextual chain of thought information that may be used for prompt engineering.

The user interface 600 may include an input box 618, which may be used by a user to input statement queries to the contextualizer.

In the illustrated examples of FIGS. 4-6, the first statement 404 asks the contextualizer to "list datasets available for analysis (via system prompt): initializing," and the first response 406 lists "6 datasets with a short description." The second statement 508 asks the contextualizer "which of these datasets would be used for performance analysis?" and the second response 510 identifies the respective dataset(s). The third statement 512 asks the contextualizer "which of these datasets would be used for security analysis," and the third response 514 identifies the respective dataset(s). The fourth statement 616 thanks the contextualizer for providing the information, and the fourth response 617 acknowledges the thank you.

Although not shown in the examples of FIGS. 3-6, it may be appreciated that the user interface 300, the user interface 400, the user interface 500, and/or the user interface 600 may be provided by a data platform. Additionally, a platform layer, such as the platform layer 224 of FIG. 2B, may receive the statements from the user interface and provide the statements with additional context (i.e., metadata) from the data source 226 to the generative AI 228, which may then generate query statements to provide to the data source 226.

Figure 7:
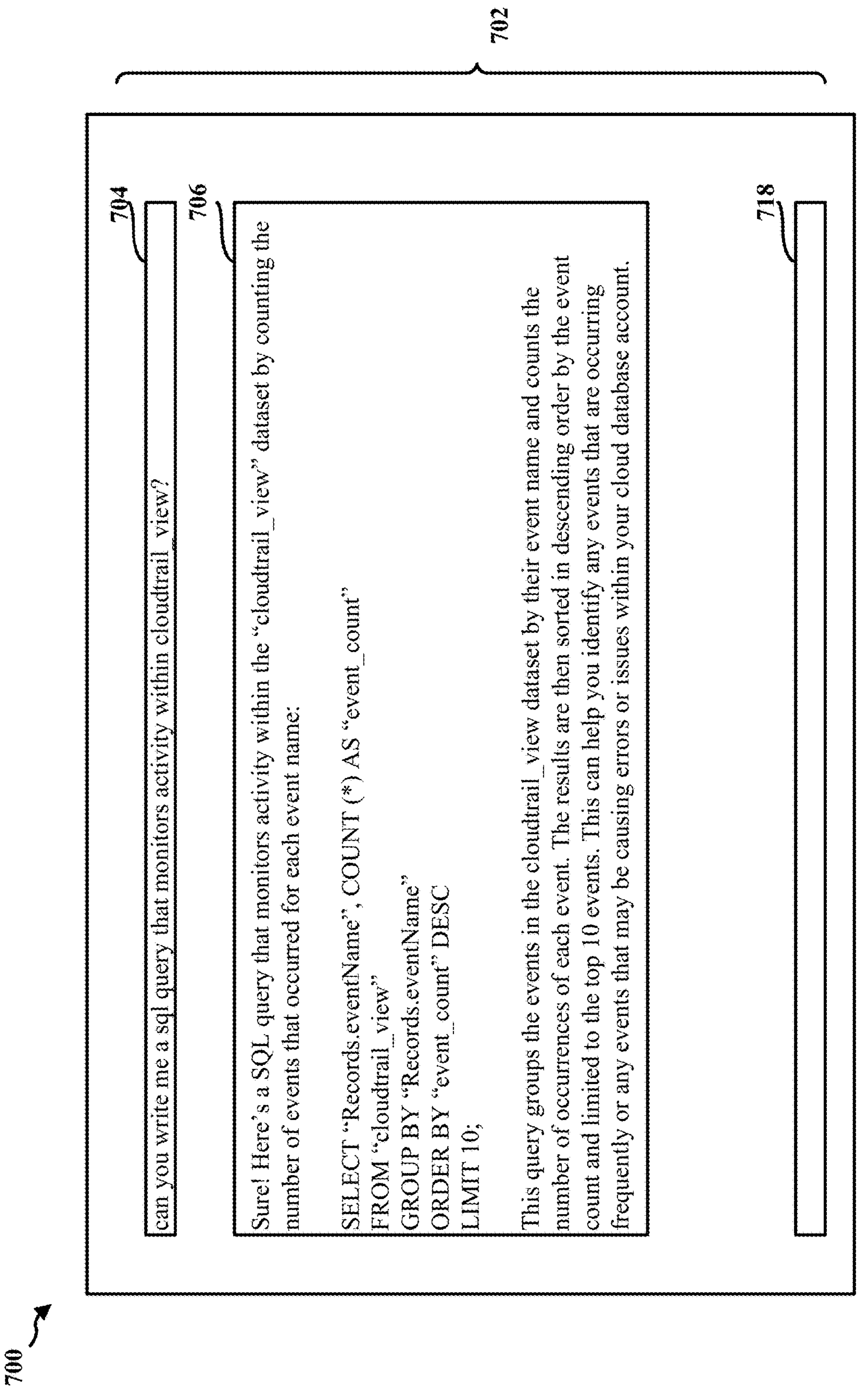
FIG. 7 is a diagram that illustrates another user interface including portions of a conversation, in accordance with various aspects of the present disclosure.

FIG. 7 is a diagram that illustrates a user interface 700 including portions of a conversation 702, as presented herein. The conversation 702 may be a continuation of the conversation 602 of FIG. 6. In the illustrated example of FIG. 7, the conversation 702 includes a first statement 704. The first statement 704 from the user asks the contextualizer to "write me a sql query that monitors activity within" a logging service. The contextualizer may then transmit a contextualized query to a generative AI to obtain the SQL query.

The contextualizer may prompt the generative AI with contextual information at the beginning of a session. For example, the contextualizer may prompt the generative AI with a statement: "the dataset 'aws_cloudtrail_view' has the following column names: 'Records.eventTime: NUMBER', 'Records.eventID: STRING', 'Records.readOnly: STRING', 'Records.awsRegion: STRING', 'Records.errorCode: STRING', 'Records.even tName: STRING', 'Records.eventTime: NUMBER', 'Records.eventType: STRING', 'Reco rds.requestID: STRING', 'Records.userAgent: STRING', 'Records.apiVersion: STRING', 'Records.eventSource: STRING', 'Records.errorMessage: STRING', 'Records.event Versi on: NUMBER', 'Records.resources. ARN: STRING', 'Records.sharedEventID: STRING', 'Records.vpcEndpointId: STRING', 'Records.resources.type: STRING', 'Records.manage mentEvent: STRING', 'Records.sourceIPAddress: STRING', 'Records.responseElements: STRING' and if a query specifies 'aws_cloudtrail_view', only use its associated columns." In other words, the contextualizer and the generative AI may have a conversation with its own chain of thought (separate from the chain of thought between the contextualizer and the user interface), which is seeded with contextual information related to a database. Here, the contextual information may include an identifier of a database, a set of identifiers for columns in the database, a set of types for each column in the database, and an association between the identifier of the database and the metadata about columns in the database. When the contextualizer later transmits a contextualized query to the generative AI within the same chain of thought, the generative AI may use both the contextualized query and the previous seeded information to generate a query statement.

The contextualizer may respond to the first statement 704 with a first response 706. The first response 706 may be from the generative AI, and may provide an SQL query that monitors activity within a logging service dataset. In the example of FIG. 7, the first response 706 includes counting the number of events that occurred for each event name. The contextualizer may transmit a contextualized query to the generative AI based on the first statement 704. In some aspects, the contextualizer may transmit the first statement 704 in addition to contextual information associated with the database. In other aspects, the contextualizer may generate a contextualized query based on the first statement 704 and the contextual information associated with the database (i.e., the contextualized query may not include the first statement 704).

In one example, a statement from a user interface may include the phrase "please write me a sql query that detects logins over the last 5 years via aws_cloudtrail_view." In response, the contextualizer may then generate a contextualized query that includes the phrase "when writing a 'query', assume today is 2023 Nov. 6 and encapsulate it in sql markdown. for the following 'sql query' ask: use the presto dialect language, only use prefix TIMESTAMP when specifying time ranges, only use JSON_VALUE command if asked to parse json data, don't use any type of sql subquery syntax in statement, don't use following commands (IF, CASE, END, SUBSTR, INSTR, INTERVAL, CURRENT_DATE, CONCAT, REGEXP, CROSS JOIN UNNEST), no more than 5 columns in projection & don't add table name, use fully qualified and double quote column names without ': type' value, if joins are needed between datasets only use inner commands. please write me a sql query that detects logins over the last 5 years via aws_cloudtrail_view." In other words, the contextualizer may append context to the query request from the user interface, where the context is associated with portions of the query request. Here, the contextualizer parses the statement provided by the user interface into portions, for example "please write me a sql query" "that detects logins" "over the last 5 years" "via aws_cloudtrail_view." In response to the first portion, the contextualizer adds sql-specific context (e.g., "encapsulate it in sql markdown," "for the following 'sql query' ask: use the presto dialect language," "only use JSON_VALUE command if asked to parse json data," "don't use any type of sql subquery syntax in statement," "don't use following commands (IF, CASE, END, SUBSTR, INSTR, INTERVAL, CURRENT_DATE, CONCAT, REGEXP, CROSS JOIN UNNEST)," "don't add table name," "use fully qualified and double quote column names without ': type' value," "if joins are needed between datasets only use inner commands"). The contextualizer may also add timing context, such as "assume today is 2023 Nov. 6," or context specific to properties of the table, such as "no more than 5 columns in projection" if the database has more than a threshold number of columns. Such rules to add context to the contextualized query may be programmed by an administrator user, or another generative AI program. In some aspects, the contextualized query may not include the original query request. For example, the contextualized query may include the statement "when writing a 'query', assume today is 2023 Nov. 6 and encapsulate it in sql markdown. for the following 'sql query' ask: use the presto dialect language, only use prefix TIMESTAMP when specifying time ranges, only use JSON_VALUE command if asked to parse json data, don't use any type of sql subquery syntax in statement, don't use following commands (IF, CASE, END, SUBSTR, INSTR, INTERVAL, CURRENT_DATE, CONCAT, REGEXP, CROSS JOIN UNNEST), no more than 5 columns in projection & don't add table name, use fully qualified and double quote column names without ':type' value, if joins are needed between datasets only use inner commands.

request SQL query. Query results include accounts with logins over the last 5 years. Write SQL query for the database with name aws_cloudtrail_view." In other words, the contextualizer may contextualize individual portions of the query request, such that the contextualized query no longer includes the text of the original query request, and instead contains contextualized interpretations with additional contextual metadata that may assist the generative AI in generating an appropriate query statement.

The user interface 700 may include an input box 718, which may be used by a user to input statement queries to the contextualizer.

Figure 8:
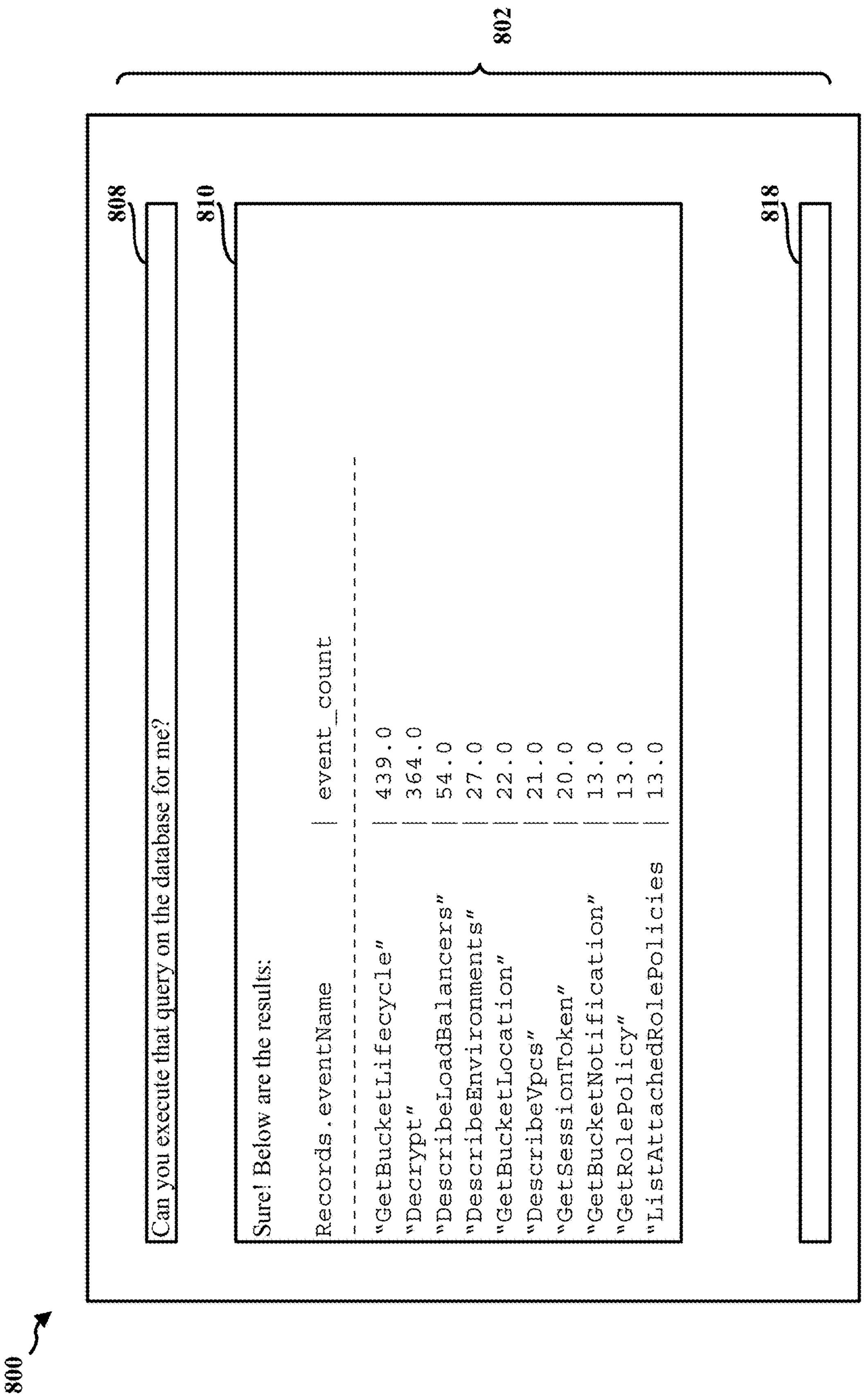
FIG. 8 is a diagram that illustrates another user interface including portions of a conversation, in accordance with various aspects of the present disclosure.

FIG. 8 is a diagram that illustrates a user interface 800 including portions of a conversation 802, as presented herein. The conversation 802 may be a continuation of the conversation 702 of FIG. 7. In the illustrated example of FIG. 8, the conversation 802 includes a second statement 808. The second statement 808 from the user asks the contextualizer to execute a query on the database. The contextualizer may then transmit the previously generated query statement to a database accessible to the contextualizer, but not accessible to the generative AI. In response the database may provide data results to the contextualizer. The contextualizer may respond to the second statement 808 with the second response 810, which may include results of the query statement run on the database.

The user interface 800 may include an input box 818, which may be used by a user to input statement queries to the contextualizer.

Figure 9:
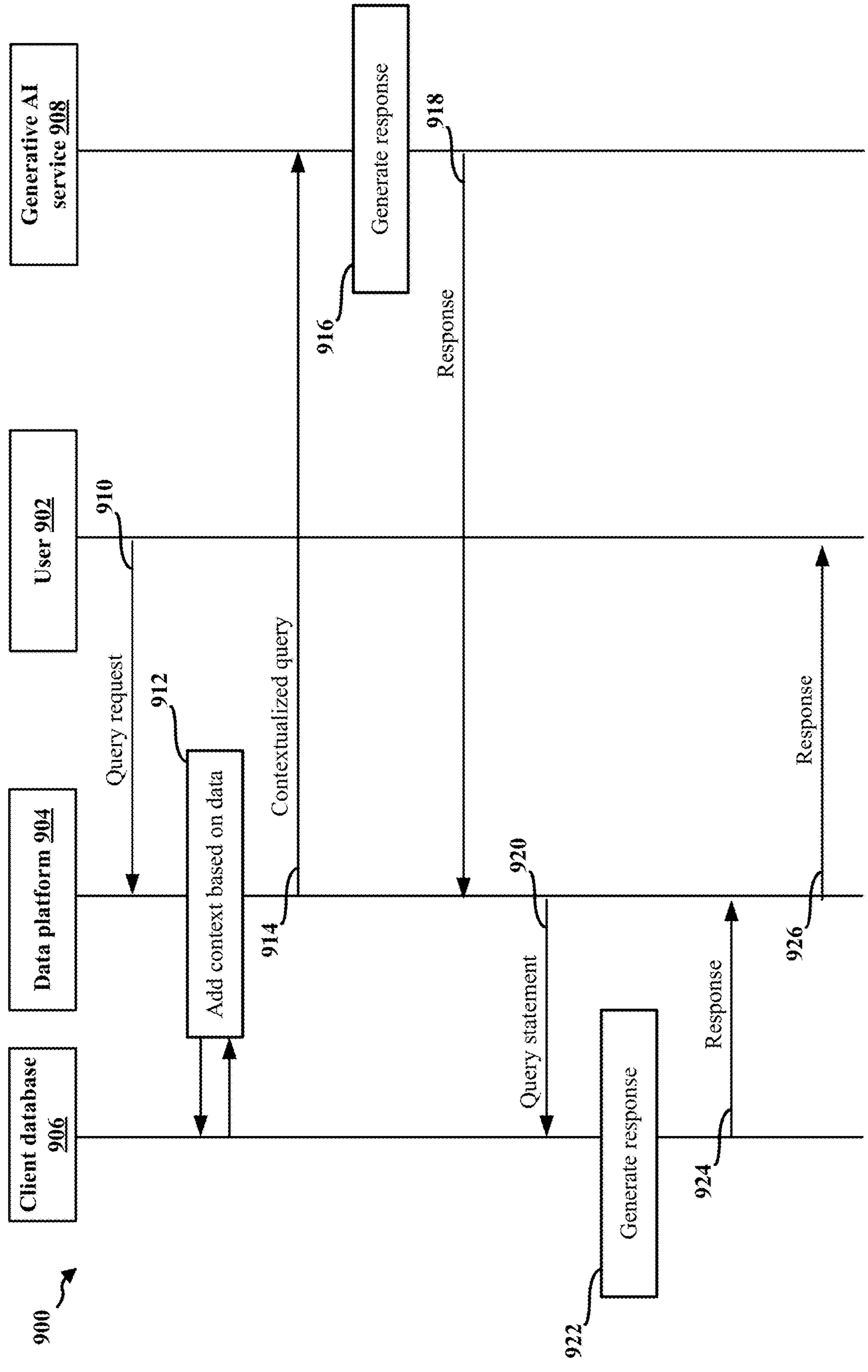
FIG. 9 illustrates an example communication flow between a user, a data platform, and a generative AI service, in accordance with various aspects of the present disclosure.

FIG. 9 illustrates an example communication flow 900 between a user 902, a data platform 904, and a generative AI service 908, as presented herein. In the example of FIG. 9, the data platform 904 is connected to a client database 906.

In the illustrated example of FIG. 9, the data platform 904 (e.g., a platform layer of the data platform 904) receives a query request 910 from the user 902. The query request 910 may be in a natural language format. Additionally, the query request 910 may request a query in a contextual statement. The data platform 904 then performs a context procedure 912 to add context to the query request 910. For example, the data platform 904 may access the client database 906 and identify metadata (e.g., schema, metrics, and/or hints) based on data stored in the client database 906. However, the context is provided without providing data from the client database 906. The data platform 904 may then transmit a contextual query 914 that is received by the generative AI service 908. The contextual query 914 may include the context that the data platform 904 obtained from the client database 906. The generative AI service 908 may perform a response procedure 916 to generate a response to the contextual query 914. The data platform 904 may then receive a response 918 from the generative AI service 908 based on the contextual query 914. The response 918 may be in a format to query the client database 906 with a "correct" query statement. The client database 906 may then perform a response procedure 922 to resolve the query statement 920. The data platform 904 may then receive a response 924 from the client database 906, and the data platform 904 may provide a response 926 to the user 902. The response 926 may resolve the query request 910 provided by the user 902.

Thus, aspects disclosed herein provide techniques to "ask for questions" instead of asking for "answers" from an LLM system, such as the generative AI service of FIG. 5. The aspects disclosed herein also provide techniques for asking with additional context statements, such as schema, metrics, and/or hints. The aspects disclosed herein also provide techniques for asking with additional response requirements, such as dialects, format, etc.

Figure 10:
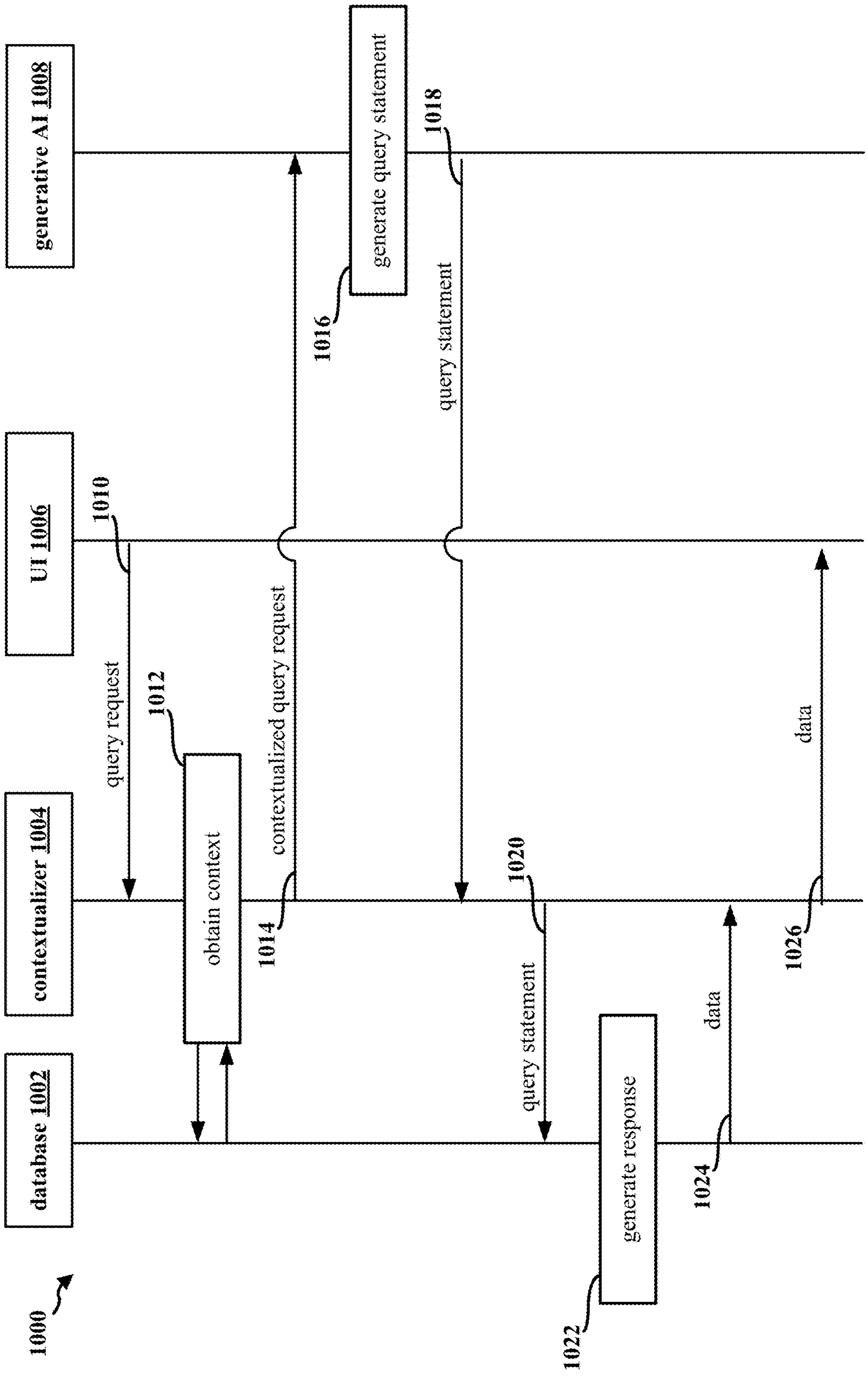
FIG. 10 illustrates an example communication flow between a database, a contextualizer, a user interface (UI), and a generative AI service, in accordance with various aspects of the present disclosure.

FIG. 10 illustrates an example communication flow 1000 between a user interface 1006 and a contextualizer 1004. The user interface 1006 may be, for example, the user interface 222 in FIG. 2B. The contextualizer 1004 may be, for example, the platform layer 224 in FIG. 2B. The generative AI 1008 may include an LLM. The LLM may be trained to generate query statements based on contextualized metadata from a set of databases. The user interface 1006 may not directly access the database 1002, and may instead access the database 1002 via the contextualizer 1004. The user interface 1006 may not directly access the generative AI 1008, and may instead access the generative AI 1008 via the contextualizer 1004. The generative AI 1008 may not directly access the database 1002, and may instead access the database 1002 via the contextualizer 1004. In other words, the contextualizer 1004 may bridge the gap between the user interface 1006, the database 1002, and the generative AI 1008.

The user interface 1006 may transmit a query request 1010 to the contextualizer 1004. The contextualizer 1004 may receive the query request 1010 from the user interface 1006. The query request 1010 may be written in a natural language format. The contextualizer 1004 may parse the query request to determine the query statement requested by the user of the user interface 1006.

At 1012, the contextualizer 1004 may obtain context about the database 1002. In some aspects, the contextualizer 1004 may obtain the context before receiving the query request 1010. In some aspects, the contextualizer 1004 may obtain context about the database 1002 in response to the query request 1010. For example, the query request 1010 may request data associated with the database 1002. The context may include metadata associated with the database 1002. The context may include a set of characteristics associated with a structure for the query statement to be generated by the generative AI 1008. The set of characteristics may include at least one of a dialect, a language, a region, an order of operations, or a format. The context may include seeding information and characteristics information. The seeding information may be based on metadata from the database 1002. The seeding information may be based on contextual information from the database 1002 associated with the query request 1010. The characteristics information may include information associated with the query structure or associated with the metadata from the database 1002 (e.g., a structure of the database).

The contextualizer 1004 may transmit a contextualized query request 1014 to the generative AI 1008. The generative AI 1008 may receive the contextualized query request 1014 from the contextualizer 1004. The generative AI 1008 may be trained to generate contextualized queries based on contextualized metadata from a set of databases. At 1016, the generative AI 1008 may generate a query statement based on the contextualized query request 1014. The contextualized query request 1014 may include an indicator for a request for the query statement 1018 from the generative AI 1008. The contextualized query request 1014 may be generated based on metadata from the database 1002. The contextualized query request 1014 may not include the text of the query request 1010. In some aspects, the contextualized query request 1014 may include portions of the query request 1010, but not the entirety of the query request 1010. In some aspects, the contextualized query request 1014 may include metadata associated with the database 1002, but may not include data entry data from the database 1002.

The generative AI 1008 may transmit the query statement 1018 to the contextualizer 1004. The contextualizer 1004 may receive the query statement 1018 from the generative AI 1008. The query statement 1018 may be based on context from the contextualized query request 1014. The query statement 1018 may be based on seeding information and characteristics information from the contextualized query request 1014. The query statement 1018 may be written in a database query format, for example an SQL database query format or an Elasticsearch query format.

In some aspects, the contextualizer 1004 may present the query statement 1018 to the user interface 1006. In other aspects, the contextualizer 1004 may transmit a notification to the user interface 1006 that the query statement 1018 was generated. The user interface 1006 may transmit a request to the contextualizer 1004 to execute the query statement 1018.

The contextualizer 1004 may transmit the query statement 1020 to the database 1002. The database 1002 may receive the query statement 1020 from the contextualizer 1004. At 1022, the database 1002 may generate a response based on the query statement 1020. For example, the database 1002 may execute the query statement 1020 to retrieve data. The database 1002 may transmit data 1024 to the contextualizer 1004. The contextualizer 1004 may receive the data 1024 from the database 1002. The contextualizer may transmit the data 1026 to the user interface 1006. The user interface 1006 may receive the data 1026 from the contextualizer 1004. The data 1026 may include well-formed data based on the query request 1010 without the user of the user interface 1006 knowing contextual information about the database 1002, and without the generative AI 1008 obtaining any data entry data from the database 1002.

Figure 11:
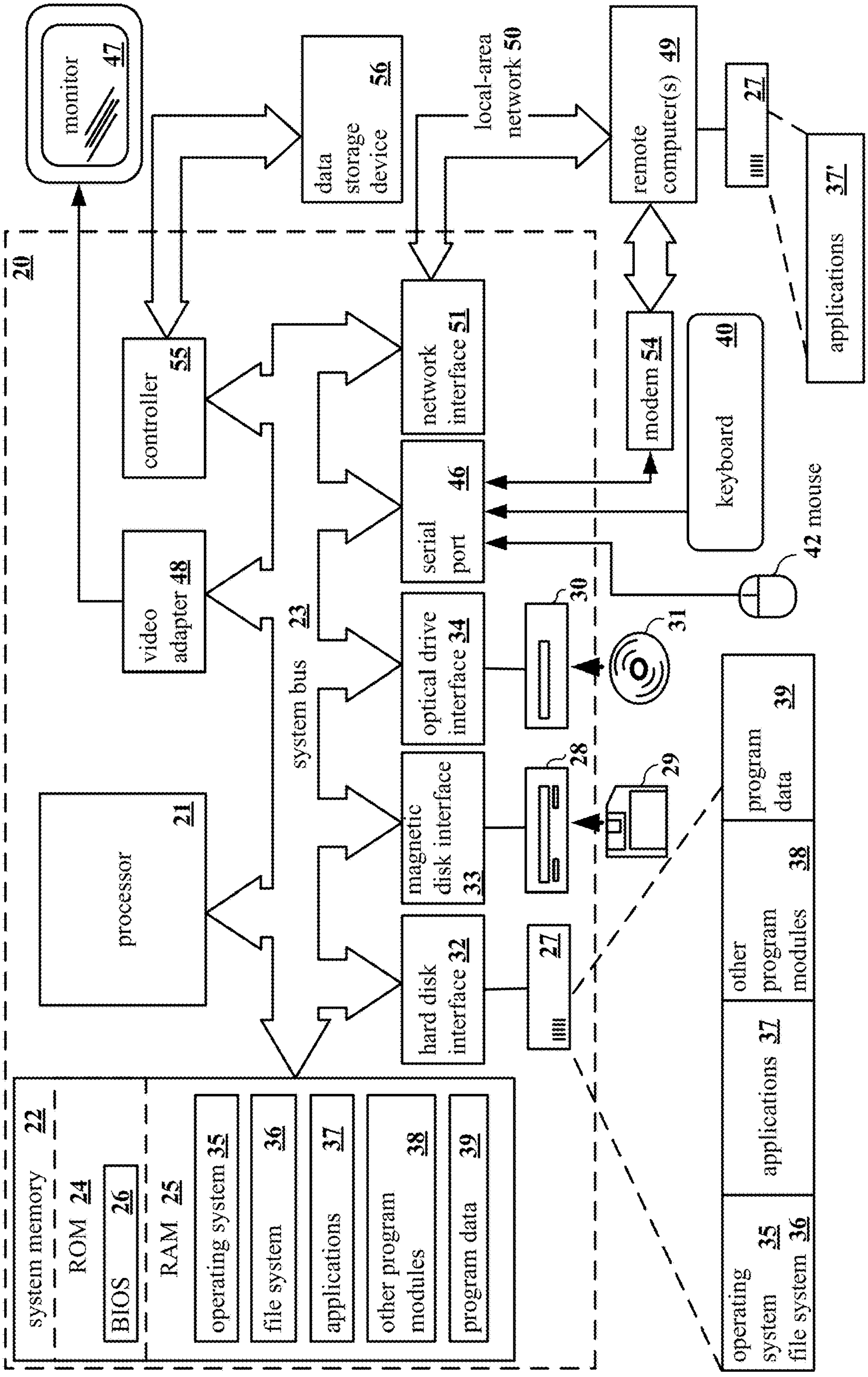
FIG. 11 is a block diagram illustrating a computer system on which aspects of systems and methods may be implemented in accordance with an example aspect.

FIG. 11 is a block diagram illustrating a computer system 20 (e.g., a general-purpose computer system) on which aspects of systems and methods for processing files stored in object storage systems may be implemented in accordance with an example aspect. The computer system 20 can correspond to the platform layer 224 of FIG. 2B, and/or the data platform 904 of FIG. 9, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (e.g., ROM 24) and random-access memory (e.g., RAM 25). The basic input/output system (e.g., BIOS 26) may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An example aspect comprises a system that uses a hard disk 27, removable magnetic disks 29, and removable optical disks 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The one or more remote computers 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (e.g., a LAN 50) and a wide-area computer network (WAN). Such networks are used in corporate computer networks and internal company networks, and they generally have access to the Internet. In LAN or WAN networks, the computer system 20 is connected to the LAN 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with particular functions facilitated by hardware alone, and other functions facilitated by a combination of hardware and software. In particular implementations, at least a portion, and in some cases, all, of a module may be executed on the processor of a general purpose computer. Accordingly, each module may be realized in a variety of suitable configurations, and should not be limited to any particular implementation exemplified herein.

In another configuration, the computer system 20 also includes means for a data platform using generative AI based analysis and queries applied to data sources. The computer system 20 may include means for receiving, from a user interface, a query request. The computer system 20 may include means for transmitting, to a generative AI system, a contextualized query based on the query request and context from a database. The computer system 20 may include means for receiving, from the generative AI system, a query statement in response to the transmission of the contextualized query. The computer system 20 may include means for transmitting, to the database, the query statement; receiving, from the database, a database response comprising a set of database entries in response to the transmission of the query statement. The computer system 20 may include means for transmitting, to the user interface, an indication of the database response. The contextualized query may include a request for the query statement. The computer system 20 may include means for transmitting, to the database, a request for a set of metadata associated with a data structure of the database. The computer system 20 may include means for receiving, from the database, the set of metadata. The computer system 20 may include means for generating the contextualized query based on the set of metadata. The computer system 20 may include means for receiving, from the user interface, a second indication of a set of metadata associated with a data structure of the database. The computer system 20 may include means for generating the contextualized query based on the set of metadata. The contextualized query may not include the query request. The contextualized query may not include data entry data from the database. The contextualized query may not include data entry data from the database. The context may include a set of characteristics associated with a structure for the query statement. The set of characteristics may include at least one of a dialect, a language, a region, an order of operations, or a format. The database may not be associated with the generative AI system. In other words, the database may not be directly accessible by the generative AI system, and the computer system 20 may be configured to only provide metadata about the database to the generative AI system, and not data entry data from the database to the generative AI system. The context may include seeding information and characteristics information. The seeding information may be based on data from the database. The seeding information may include contextual information associated with the query request. The characteristics information may be associated with a structure for the response from the database. The query statement may be based on the seeding information and the characteristics information. The generative AI system may include an LLM. The query request may include a natural-language format. The query statement may include a database query format. The database query format may include a structured query language (SQL) database query format. The database query format may include an Elasticsearch query format. The computer system 20 may include means for transmitting, to the user interface, the query statement. The computer system 20 may include means for receiving, from the user interface, database execution request before the transmission of the query statement to the database. The transmission of the query statement to the database may be in response to the reception of the database execution request.

Among others, examples of AI that may be used to provide the AI based analysis and queries to the data platform may include machine learning, deep learning, neural networks, among other examples. For example, aspects may include artificial neural networks, such as a recurrent neural network; decision tree learning; convolutional neural networks; deep learning architectures in which an output of a first layer of neurons becomes an input to a second layer of neurons, and so forth; support vector machines (e.g., including a separating hyperplane that categorizes data); regression analysis; Bayesian networks; genetic algorithms; Deep convolutional networks configured with additional pooling and normalization layers; and Deep belief networks.

In some aspects, a neural network of interconnected nodes may include output of one node connected as the input to another node. Connections between nodes may be referred to as edges, and weights may be applied to the connections/edges to adjust the output from one node that is applied as the input to another node. Nodes may apply thresholds in order to determine whether, or when, to provide output to a connected node. The output of each node may be calculated as a non-linear function of a sum of the inputs to the node. The neural network may include any number of nodes and any type of connections between nodes. The neural network may include one or more hidden nodes. Nodes may be aggregated into layers, and different layers of the neural network may perform different kinds of transformations on the input. A signal may travel from input at a first layer through the multiple layers of the neural network to output at a last layer of the neural network and may traverse a layer multiple times. The output may then be provided to the data platform in response to the request. The data platform may use the output to run a query on its dataset.

In some aspects, the AI component presented herein may use machine-learning algorithms, deep-learning algorithms, neural networks, reinforcement learning, regression, boosting, or advanced signal processing methods for receiving content and identifying content of interest for particular users.

Reinforcement learning is a type of machine learning that involves the concept of taking actions in an environment in order to maximize a reward. Reinforcement learning is a machine learning paradigm. Other paradigms include supervised learning and unsupervised learning. Basic reinforcement may be modeled as a Markov decision process (MDP) with a set of environment states and agent states, as well as a set of actions of the agent. A determination may be made about a likelihood of a state transition based on an action and a reward after the transition. The action selection by an agent may be modeled as a policy. The reinforcement learning may enable the agent to learn an optimal, or nearly-optimal, policy that maximizes a reward. Supervised learning may include learning a function that maps an input to an output based on example input-output pairs, which may be inferred from a set of training data, which may be referred to as training examples. The supervised learning algorithm analyzes the training data and provides an algorithm to map to new examples.

Regression analysis may include statistical analysis to estimate the relationships between a dependent variable (e.g., an outcome variable) and one or more independent variables. Linear regression is an example of a regression analysis. Non-linear regression models may also be used. Regression analysis may include estimating, or determining, relationships of cause between variables in a dataset.

Boosting includes one or more algorithms for reducing variance or bias in supervised learning. Boosting may include iterative learning based on weak classifiers (e.g., that are somewhat correlated with a true classification) with respect to a distribution that is added to a strong classifier (e.g., that is more closely correlated with the true classification) in order to convert weak classifiers to stronger classifiers. The data weights may be readjusted through the process, e.g., related to accuracy.

Among others, examples of machine learning models or neural networks that may be included in the content identification system include, for example, artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; Bayesian networks; genetic algorithms; deep convolutional networks (DCNs) configured with additional pooling and normalization layers; and deep belief networks (DBNs).

In some aspects, a machine learning model may include a non-linear statistical data model and/or a decision making model. Machine learning may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivated, compression, decompression, quantization, flattening, etc. The term layer may indicate an operation on input data. Weights, biases, coefficients, and operations may be adjusted in order to achieve an output closer to the target output. Weights and biases are examples of parameters of a trained machine learning model. Different layers of a machine learning model may be trained separately.

A variety of connectivity patterns, e.g., including any of feed-forward networks, hierarchical layers, recurrent architectures, feedback connections, etc., may be included in a machine learning model. Layer connections may be fully connected or locally connected. For a fully connected network, a first layer neuron may communicate an output to each neuron in a second layer. Each neuron in the second layer may receive input from each neuron in the first layer. For a locally connected network, a first layer neuron may be connected to a subset of neurons in the second layer, rather than to each neuron of the second layer. A convolutional network may be locally connected and may be configured with shared connection strengths associated with the inputs for each neuron in the second layer. In a locally connected layer of a network, each neuron in a layer may have the same, or a similar, connectivity pattern, yet having different connection strengths.

A machine learning model, artificial intelligence component, or neural network may be trained, such as training based on supervised learning. During training, the machine learning model may be presented with an input that the model uses to compute to produce an output. The actual output may be compared to a target output, and the difference may be used to adjust parameters (e.g., weights, biases, coefficients, etc.) of the machine learning model in order to provide an output closer to the target output. Before training, the output may not be correct or may be less accurate. A difference between the output and the target output, may be used to adjust weights of a machine learning model to align the output is more closely with the target.

A learning algorithm may calculate a gradient vector for adjustment of the weights. The gradient may indicate an amount by which the difference between the output and the target output would increase or decrease if the weight were adjusted. The weights, biases, or coefficients of the model may be adjusted until an achievable error rate stops decreasing or until the error rate has reached a target level.

Figure 12:
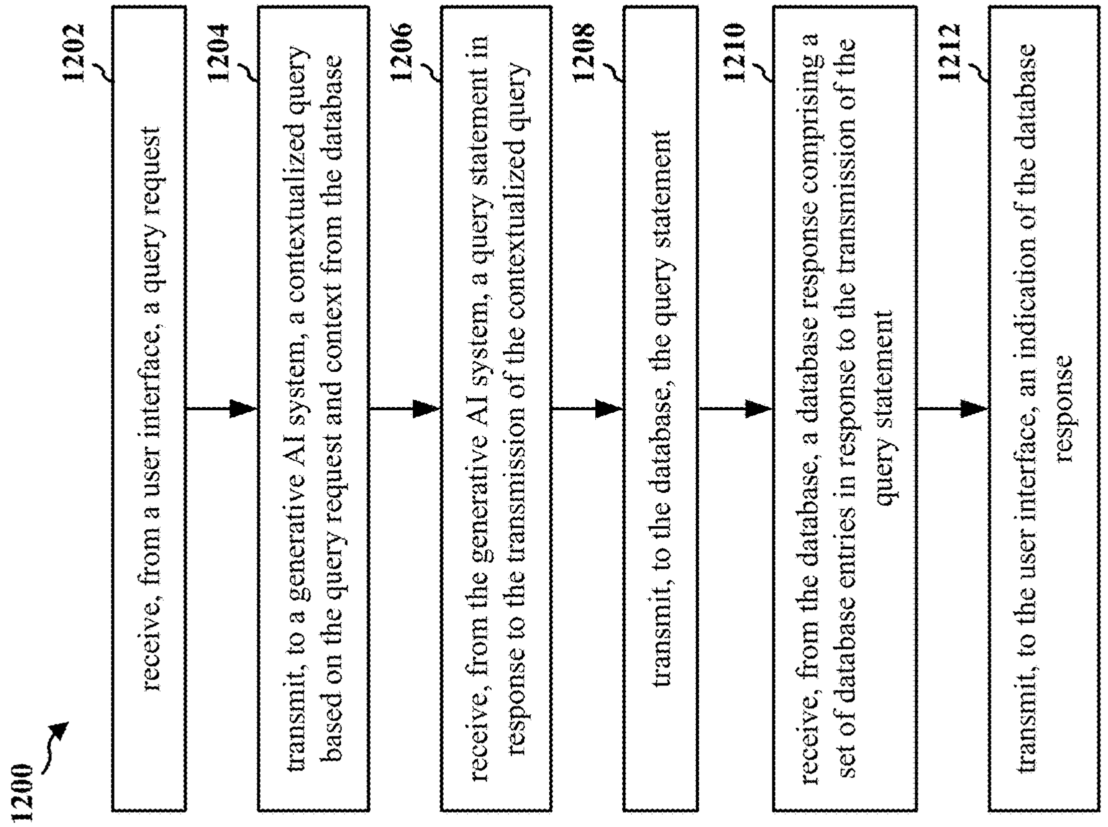
FIG. 12 is a flowchart of a method of querying a database, in accordance with various aspects of the present disclosure.

FIG. 12 is a flowchart 1200 of a method of querying a database. The method may be performed by a contextualizer (e.g., the platform layer 224, the data platform 904, the contextualizer 1004, the computer system 20). At 1202, the contextualizer may receive, from a user interface, a query request. For example, 1202 may be performed by the contextualizer 1004 in FIG. 10, which may receive, from a user interface, a query request. Moreover, 1202 may be performed by the platform layer 224 in FIG. 2B, which may receive, from a user interface, a query request.

At 1204, the contextualizer may transmit, to a generative AI system, a contextualized query based on the query request and context from the database. For example, 1204 may be performed by the contextualizer 1004 in FIG. 10, which may transmit, to a generative AI system, a contextualized query based on the query request and context from the database. Moreover, 1204 may be performed by the platform layer 224 in FIG. 2B, which may transmit, to a generative AI system, a contextualized query based on the query request and context from the database.

At 1206, the contextualizer may receive, from the generative AI system, a query statement in response to the transmission of the contextualized query. For example, 1206 may be performed by the contextualizer 1004 in FIG. 10, which may receive, from the generative AI system, a query statement in response to the transmission of the contextualized query. Moreover, 1206 may be performed by the platform layer 224 in FIG. 2B, which may receive, from the generative AI system, a query statement in response to the transmission of the contextualized query.

At 1208, the contextualizer may transmit, to the database, the query statement. For example, 1208 may be performed by the contextualizer 1004 in FIG. 10, which may transmit, to the database, the query statement. Moreover, 1208 may be performed by the platform layer 224 in FIG. 2B, which may transmit, to the database, the query statement.

At 1210, the contextualizer may receive, from the database, a database response comprising a set of database entries in response to the transmission of the query statement. For example, 1210 may be performed by the contextualizer 1004 in FIG. 10, which may receive, from the database, a database response comprising a set of database entries in response to the transmission of the query statement. Moreover, 1210 may be performed by the platform layer 224 in FIG. 2B, which may receive, from the database, a database response comprising a set of database entries in response to the transmission of the query statement.

At 1212, the contextualizer may transmit, to the user interface, an indication of the database response. For example, 1212 may be performed by the contextualizer 1004 in FIG. 10, which may transmit, to the user interface, an indication of the database response. Moreover, 1212 may be performed by the platform layer 224 in FIG. 2B, which may transmit, to the user interface, an indication of the database response.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents. In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

Aspect 1 is a computer-implemented method, comprising: receiving, from a user interface, a query request; transmitting, to a generative AI system, a contextualized query based on the query request and context from a database; receiving, from the generative AI system, a query statement in response to the transmission of the contextualized query; transmitting, to the database, the query statement; receiving, from the database, a database response comprising a set of database entries in response to the transmission of the query statement; and transmitting, to the user interface, an indication of the database response.

Aspect 2 is the method of aspect 1, wherein the contextualized query comprises a request for the query statement.

Aspect 3 is the method of either of aspects 1 to 2, further comprising: transmitting, to the database, a request for a set of metadata associated with a data structure of the database; receiving, from the database, the set of metadata; and generating the contextualized query based on the set of metadata.

Aspect 4 is the method of any of aspects 1 to 3, further comprising: receiving, from the user interface, a second indication of a set of metadata associated with a data structure of the database; and generating the contextualized query based on the set of metadata.

Aspect 5 is the method of any of aspects 1 to 4, wherein the contextualized query does not include the query request.

Aspect 6 is the method of any of aspects 1 to 5, wherein the contextualized query does not include data entry data from the database.

Aspect 7 is the method of any of aspects 1 to 6, wherein the context comprises metadata associated with the database.

Aspect 8 is the method of any of aspects 1 to 7, wherein the context comprises a set of characteristics associated with a structure for the query statement.

Aspect 9 is the method of aspect 8, wherein the set of characteristics comprises at least one of a dialect, a language, a region, an order of operations, or a format.

Aspect 10 is the method of any of aspects 1 to 9, wherein the database is not associated with the generative AI system.

Aspect 11 is the method of any of aspects 1 to 10, wherein the context comprises seeding information and characteristics information, wherein the seeding information is based on data from the database, wherein the seeding information comprises contextual information associated with the query request, wherein the characteristics information is associated with a structure for the response from the database.

Aspect 12 is the method of aspect 11, wherein the query statement is based on the seeding information and the characteristics information.

Aspect 13 is the method of any of aspects 1 to 12, wherein the generative AI system comprises a large language model (LLM).

Aspect 14 is the method of any of aspects 1 to 13, wherein the query request comprises a natural-language format, wherein the query statement comprises a database query format.

Aspect 15 is the method of aspect 14, wherein the database query format comprises at least one of: a structured query language (SQL) database query format; or an Elasticsearch query format.

Aspect 16 is the method of any of aspects 1 to 15, further comprising: transmitting, to the user interface, the query statement; and receiving, from the user interface, database execution request before the transmission of the query statement to the database, wherein the transmission of the query statement to the database is in response to the reception of the database execution request.

Aspect 17 is an apparatus for wireless communication, comprising: at least one memory; and at least one processor coupled to the at least one memory and, based at least in part on information stored in the at least one memory, the at least one processor, individually or in any combination, is configured to perform the method of any of aspects 1 to 16.

Aspect 18 is an apparatus for wireless communication, comprising means for performing each step in the method of any of aspects 1 to 16.

Aspect 19 is a computer-readable medium (e.g., a non-transitory computer-readable medium) storing computer executable code, the code when executed by at least one processor causes the at least one processor, individually or in any combination, to perform the method of any of aspects 1 to 16.

What is claimed is:

1. An apparatus for querying a database, comprising:

at least one memory; and at least one processor coupled to the at least one memory and, based at least in part on information stored in the at least one memory, the at least one processor, individually or in any combination, is configured to:

receive, from a user interface, a query request;

transmit, to the database, a request for a set of metadata associated with a data structure of the database based on the received query request;

receive, from the database, the set of metadata;

generate a context for the database based on the received set of metadata, wherein, to generate the context for the database based on the received set of metadata, the at least one processor, individually or in any combination, is configured to generate seeding information based on the received query request and characteristics information based on a structure for a database response from the database;

generate a contextualized query based on the received query request from the user interface and the received set of metadata from the database, wherein to generate the contextualized query based on the query request and the received set of metadata, the at least one processor, individually or in any combination, is configured to generate the contextualized query further based on the generated context for the database;

transmit, to a generative AI system, the generated contextualized query and a request for a query statement based on the generated contextualized query, wherein the database is not accessible to the generative AI system;

receive, from the generative AI system, the query statement based on the transmitted contextualized query and the transmitted request for the generative AI system to generate the query statement;

transmit, to the database, the received query statement;

receive, from the database, the database response comprising a set of database entries after transmission of the received query statement; and transmit, to the user interface, an indication of the database response.

2. The apparatus of claim 1, wherein the at least one processor, individually or in any combination, is further configured to:

receive, from the user interface, a second indication of a second set of metadata associated with the data structure of the database, wherein, to generate the contextualized query based on the query request and the received set of metadata, the at least one processor, individually or in any combination, is configured to:

generate the contextualized query further based on the second set of metadata.

3. The apparatus of claim 1, wherein the generated contextualized query does not include the query request.

4. The apparatus of claim 1, wherein the generated contextualized query does not include data entry data from the database.

5. The apparatus of claim 1, wherein the at least one processor, individually or in any combination, is further configured to:

generate a context for the database based on the received set of metadata, wherein, to generate the contextualized query based on the query request and the received set of metadata, the at least one processor, individually or in any combination, is configured to:

generate the contextualized query further based on the generated context for the database.

6. The apparatus of claim 5, wherein the generated context comprises a set of characteristics associated with a structure for the query statement.

7. The apparatus of claim 6, wherein the set of characteristics comprises at least one of a dialect, a language, a region, an order of operations, or a format.

8. The apparatus of claim 1, wherein the database is not associated with the generative AI system.

9. The apparatus of claim 1, wherein, to generate the query statement, the at least one processor, individually or in any combination, is configured to:

generate the query statement based on the generated seeding information and the generated characteristics information.

10. The apparatus of claim 1, wherein the generative AI system comprises a large language model (LLM).

11. The apparatus of claim 1, wherein the query request comprises a natural-language format, wherein the query statement comprises a database query format.

12. The apparatus of claim 11, wherein the database query format comprises at least one of:

a structured query language (SQL) database query format; or an Elasticsearch query format.

13. The apparatus of claim 1, wherein the at least one processor, individually or in any combination, is further configured to:

transmit, to the user interface, the received query statement; and receive, from the user interface, a database execution request, wherein the transmission of the received query statement to the database is in response to a reception of the database execution request.

14. A computer-implemented method, comprising:

receiving, from a user interface, a query request;

transmitting, to a database, a request for a set of metadata associated with a data structure of the database based on the received query request;

receiving, from the database, the set of metadata;

generating a context for the database based on the received set of metadata, wherein generating the context for the database based on the received set of metadata comprises generating seeding information based on the received query request and characteristics information based on a structure for a database response from the database;

generating a contextualized query based on the received query request from the user interface and the received set of metadata from the database, wherein generating the contextualized query based on the query request and the received set of metadata comprises generating the contextualized query further based on the generated context for the database;

transmitting, to a generative AI system, the generated contextualized query and a request for a query statement based on the generated contextualized query, wherein the database is not accessible to the generative AI system;

receiving, from the generative AI system, the query statement based on the transmitted contextualized query and the transmitted request for the generative AI system to generate the query statement;

transmitting, to the database, the received query statement;

receiving, from the database, the database response comprising a set of database entries after transmission of the received query statement; and transmitting, to the user interface, an indication of the database response.

15. An apparatus for querying a database, comprising:

means for receiving, from a user interface, a query request;

means for transmitting, to the database, a request for a set of metadata associated with a data structure of the database based on the received query request;

means for receiving, from the database, the set of metadata;

means for generating a context for the database based on the received set of metadata, wherein the means for generating the context for the database based on the received set of metadata comprises means for generating seeding information based on the received query request and characteristics information based on a structure for a database response from the database;

means for generating a contextualized query based on the received query request from the user interface and the received set of metadata from the database, wherein the means for generating the contextualized query based on the query request and the received set of metadata comprises means for generating the contextualized query further based on the generated context for the database;

means for transmitting, to a generative AI system, the generated contextualized query and a request for a query statement based on the generated contextualized query, wherein the database is not accessible to the generative AI system;

means for receiving, from the generative AI system, the query statement based on the transmitted contextualized query and the transmitted request for the generative AI system to generate the query statement;

means for transmitting, to the database, the received query statement;

means for receiving, from the database, the database response comprising a set of database entries after transmission of the received query statement; and means for transmitting, to the user interface, an indication of the database response.

* * * * *